United States Patent
Young

(10) Patent No.: US 10,697,506 B2
(45) Date of Patent: Jun. 30, 2020

(54) PUMPJACK LOCK

(71) Applicant: Patrick Craig Young, Williston, ND (US)

(72) Inventor: Patrick Craig Young, Williston, ND (US)

(*) Notice: Subject to any disclaimer, the term of this patent is extended or adjusted under 35 U.S.C. 154(b) by 0 days.

(21) Appl. No.: 15/703,661

(22) Filed: Sep. 13, 2017

(65) Prior Publication Data

US 2018/0073579 A1   Mar. 15, 2018

Related U.S. Application Data

(60) Provisional application No. 62/393,796, filed on Sep. 13, 2016, provisional application No. 62/528,807, filed on Jul. 5, 2017.

(51) Int. Cl.
*B60T 1/00* (2006.01)
*F16D 63/00* (2006.01)
(Continued)

(52) U.S. Cl.
CPC ........... *F16D 63/008* (2013.01); *F16D 51/00* (2013.01); *F16D 63/006* (2013.01); *E21B 23/02* (2013.01); *F16D 2051/003* (2013.01)

(58) Field of Classification Search
CPC ........ F16D 63/006; B60T 1/067; B60T 1/005; B60T 1/062; F16H 63/3416;
(Continued)

(56) References Cited

U.S. PATENT DOCUMENTS 1,346,949 A * 7/1920 Gibson .................. B60T 1/005
188/31
3,642,100 A * 2/1972 Travis ..................... B60T 1/005
188/69
(Continued)

FOREIGN PATENT DOCUMENTS

DE        102013106303 A1 * 12/2014 ......... F16H 63/3416

OTHER PUBLICATIONS

Hess Corporation, "Simple Innovation Makes Big Impact on Oilfield Safety," copyright 2013-2018, which refers a "Global Health, Safety and Environmental Award at the 2012 International Conference on Health, Safety and Environment." (http://www.hess.com/sustainability/pump-jack#.W0T4GCpyfdU.email), published as early as 2014 (as shown by Wayback Machine).
(Continued)

*Primary Examiner* — Bradley T King
*Assistant Examiner* — Stephen M Bowes
(74) *Attorney, Agent, or Firm* — James R. Young; Cochran Freund & Young LLC

(57) ABSTRACT

A brake lock system for a pumpjack brake apparatus comprises a latch handle lever pivotally mounted at a location on a pumpjack, a countershaft rotatably mounted on the pumpjack, latch handle linkage, and control linkage that transitions movement and force of the latch handle lever to a latch arm with a latch dog for pivoting the latch arm to insert the latch dog in a notch in the pumpjack brake apparatus. The latch handle, latch handle linkage, control linkage, and latch arm have dimensions that provide a mechanical advantage of the latch handle lever over the latch arm.

8 Claims, 20 Drawing Sheets

(51) Int. Cl.
*F16D 51/00* (2006.01)
*E21B 23/02* (2006.01)

(58) Field of Classification Search
CPC ............ F16H 63/3425; F16H 63/3433; E21B 43/127; E21B 2043/125
See application file for complete search history.

(56) References Cited

U.S. PATENT DOCUMENTS

| | | | | |
|---|---|---|---|---|
| 3,729,075 | A * | 4/1973 | Piret | B60T 1/005 |
| | | | | 188/69 |
| 4,194,393 | A * | 3/1980 | Boley | E21B 43/127 |
| | | | | 346/33 R |
| 5,906,259 | A * | 5/1999 | Matsui | B60T 1/005 |
| | | | | 192/219.5 |
| 9,574,625 | B2 | 2/2017 | Beck et al. | |
| 2002/0092710 | A1* | 7/2002 | Oppitz | B60T 1/005 |
| | | | | 188/69 |
| 2015/0252897 | A1* | 9/2015 | Kristofcsak | F16H 63/18 |
| | | | | 192/219.5 |
| 2017/0292605 | A1* | 10/2017 | Hamaya | F16H 63/3466 |
| 2018/0051804 | A1* | 2/2018 | Singh | B60T 1/005 |

OTHER PUBLICATIONS

Two photos of a device on an oil well pump in western North Dakota, which the Applicant, Patrick Craig Young, believes is operated by QEP Resources, Inc., of Denver, Colorado, and which the Applicant believes to be the same as or similar to the safety device described in the Hess website listed above, which dates public use of that device as early as 2012.

* cited by examiner

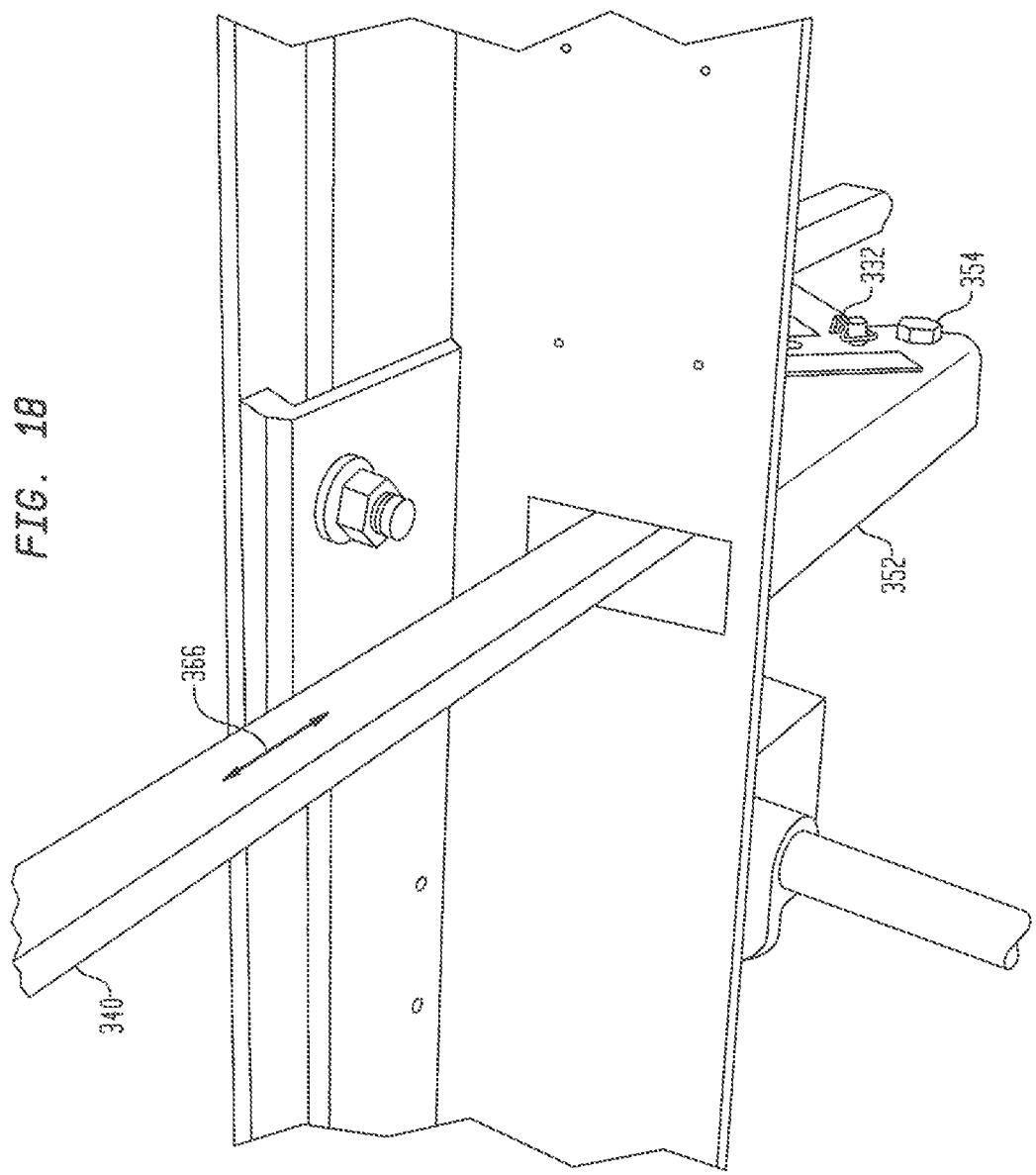

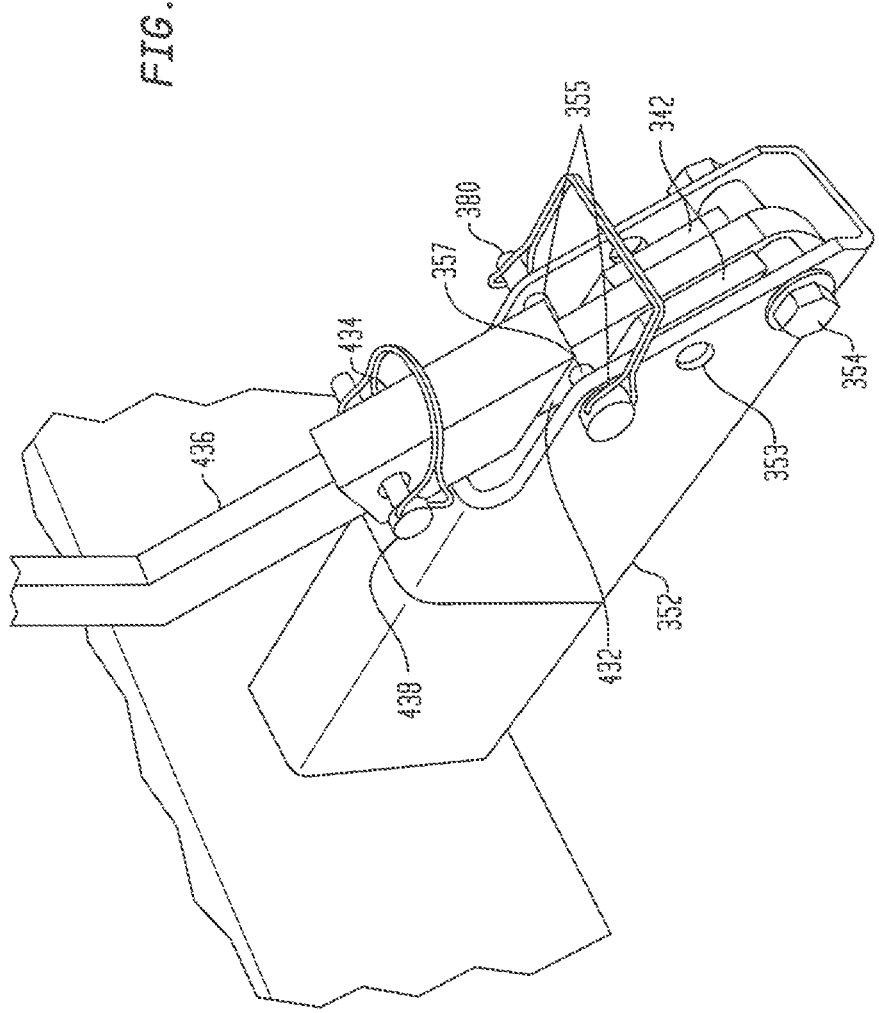

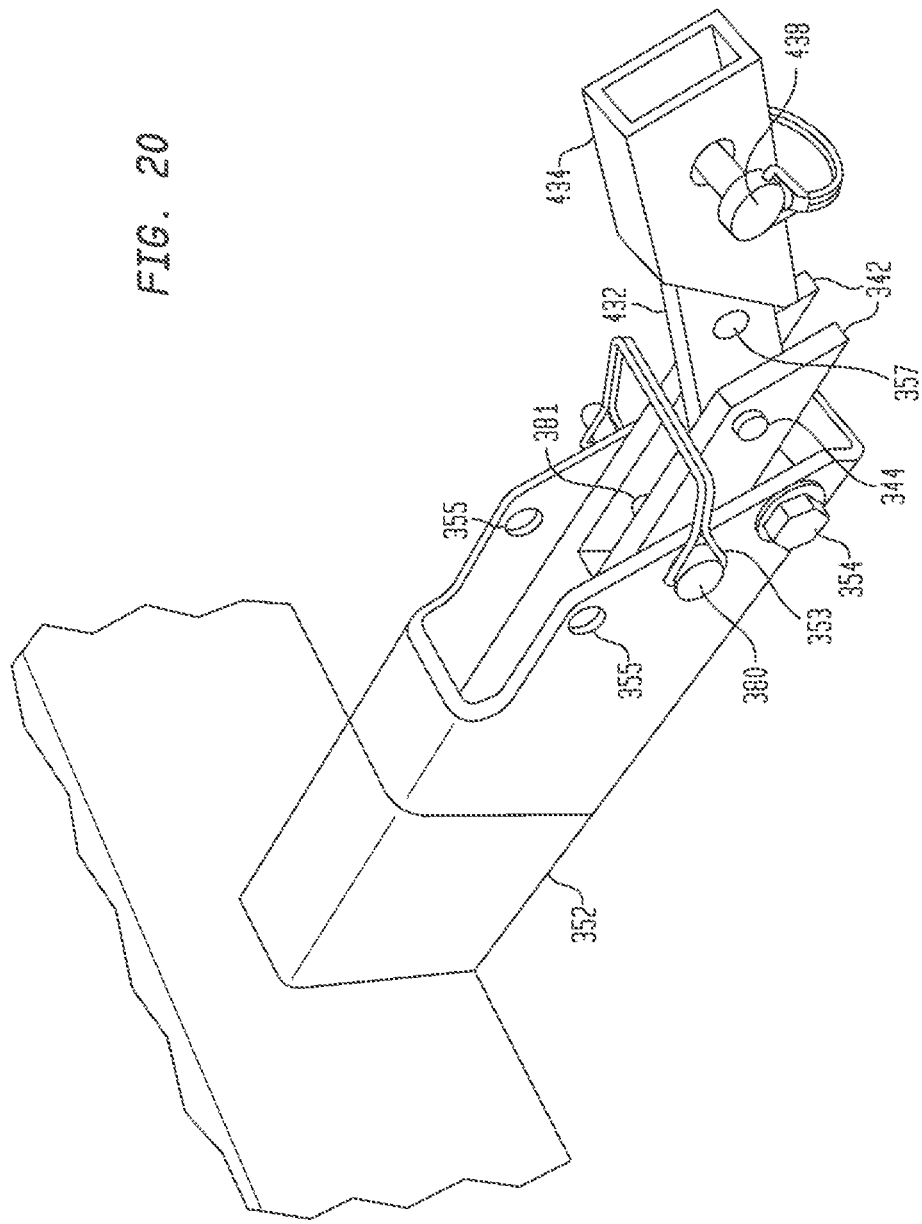

PUMPJACK LOCK

BACKGROUND OF THE INVENTION

Field of the Invention

The present invention relates generally to oil well pumps and more specifically to brake locks on oil well pumps.

Description of the Prior Art

Pumpjacks (also sometimes called pumping units, horsehead pumps, and a variety of other terms associated with their motion or appearance) are well-known mechanical devices used to drive reciprocating piston pumps in oil wells. Such pumpjacks, e.g., the pumpjack 10 illustrated in FIG. 1 based on a well-known pumpjack manufactured by Weatherford, of Houston, Tex., are typically characterized by a walking beam 12 mounted in an A-frame 14 and connected at one end by pitman arms 16 to a rotating crank unit 18, which imparts a rocking motion to the walking beam 12. The other end of the walking beam 12 is connected by cables 20 (sometimes called a wireline or bridle) to oil well pumping apparatus in an oil well W for converting rotary motion of a motor 22 to reciprocating motion for driving the oil well pumping apparatus. Typically, the cables 20 are connected to a polished rod P of the oil well pumping apparatus, and the polished rod P is connected by a long sucker rod (not seen in FIG. 1), which runs through a tubing string (not seen in FIG. 1) in the oil well W, to a piston rod of a pump piston (not seen in FIG. 1) that slides up and down in a pump barrel (not seen in FIG. 1) attached to the tubing string at the bottom of the well W deep in the ground. The reciprocating motion of the piston upwardly and downwardly in the pump barrel at the bottom of the well W imparted by the pumpjack 10 on the surface of the ground pumps liquid (e.g., oil and water) from the bottom of the well W upwardly through the tubing to a well head H on the surface of the ground, where the liquid is then collected and processed for transport from the well.

Many typical pumpjacks 10 are large pieces of machinery driven by powerful motors 22, and the crank units 18, including large, heavy counterweights 24, rotate in large radius circles, thus can be dangerous for persons working in the area. Consequently, for safety, many pumpjack operators provide fences around pumpjacks to inhibit people and animals from getting too close to the pumpjacks while the pumpjacks are operating. However, occasionally or periodically, pumpjacks have to be maintained or repaired. To maintain safety, many pumpjack operators require not only that the motor 22 of the pumpjack be shut down during maintenance or repairs, but also that the crank unit 18 must be locked against motion, which also locks all other movable components of the pumpjack 10 against motion, because the weight of the counterweights 24, the weight of the long sucker rod, the weight of the liquid in the pump, and other forces can cause the crank unit 18 and other components to move, sometimes unexpectedly, even when the motor 22 is shut off. To facilitate such locking, some pumpjack manufacturers provide a brake 26 on a shaft 28, for example, a main shaft or countershaft of a transmission 29 that transmits rotating motion of the motor to rotating motion (usually reduced motion) of the crank unit, along with a latch mechanism 30 to lock the shaft 28 against rotational movement. The brake 26 is used to stop rotation of the shaft 28, and the latch 30 is then engaged to prevent rotation, even if the brake 26 is released.

The foregoing examples of the related art and limitations related therewith are intended to be illustrative and not exclusive. Other limitations of the related art will become apparent to persons skilled in the art upon a reading of the specification and a study of the drawings.

BRIEF DESCRIPTION OF THE DRAWINGS

The accompanying Figures, which are incorporated herein and form a part of the specification, illustrate some, but not the only or exclusive, example embodiments and/or features. It is intended that the embodiments and Figures disclosed herein are to be considered illustrative rather than limiting. In the Figures:

FIG. 18 shows a latch link rod that connects the handle of the alternative embodiment latch apparatus to the countershaft;

FIG. 19 shows an alternative removable handle embodiment for the example latch apparatus examples in FIGS. 1-18; and FIG. 20 shows the alternative removable handle embodiment in FIG. 19, but with the handle arm detached and removed from the handle socket.

DETAILED DESCRIPTION OF EXAMPLE EMBODIMENTS

Figure 1:
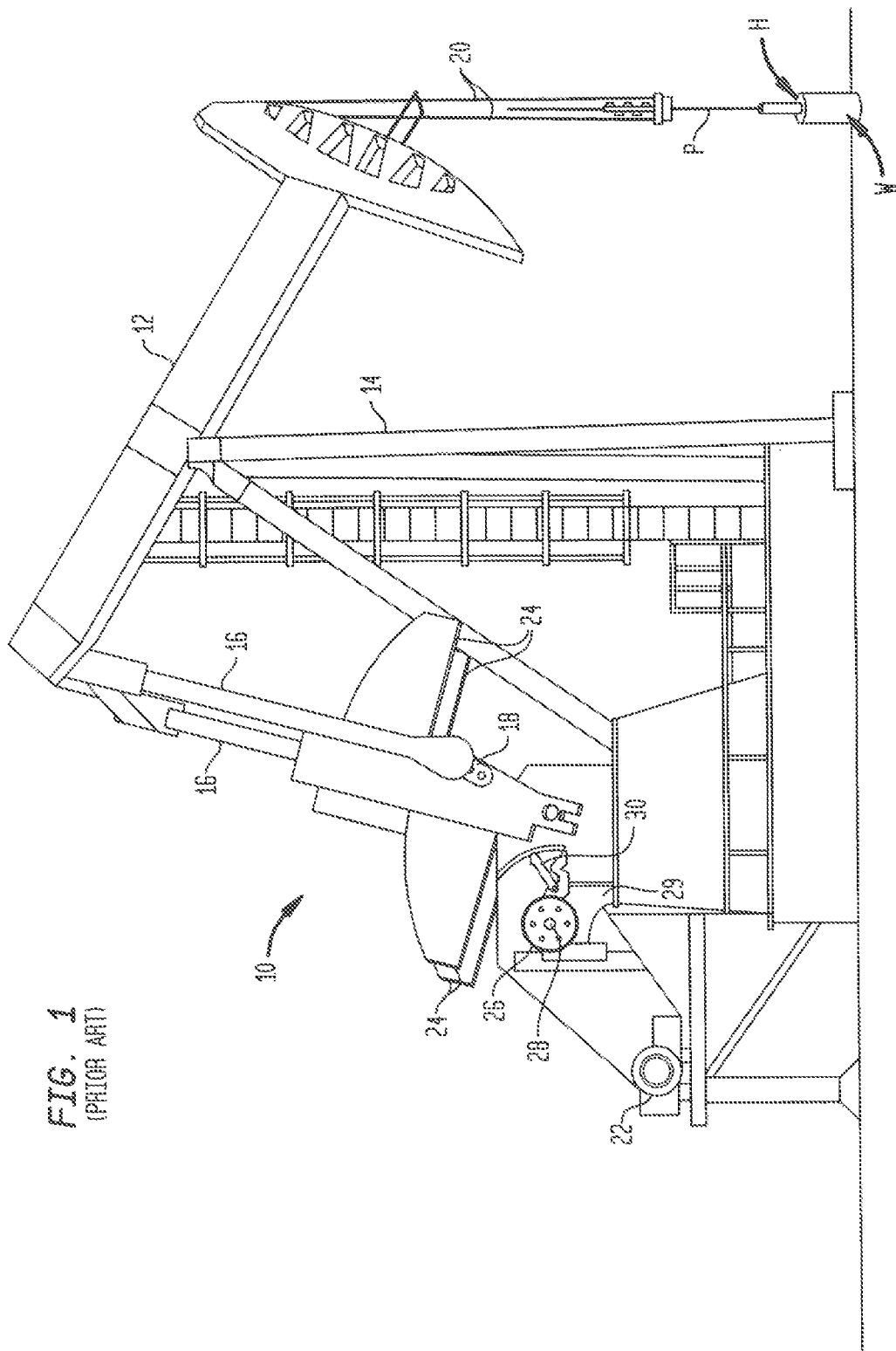
FIG. 1 is a perspective view of a conventional pumpjack.
Figure 2:
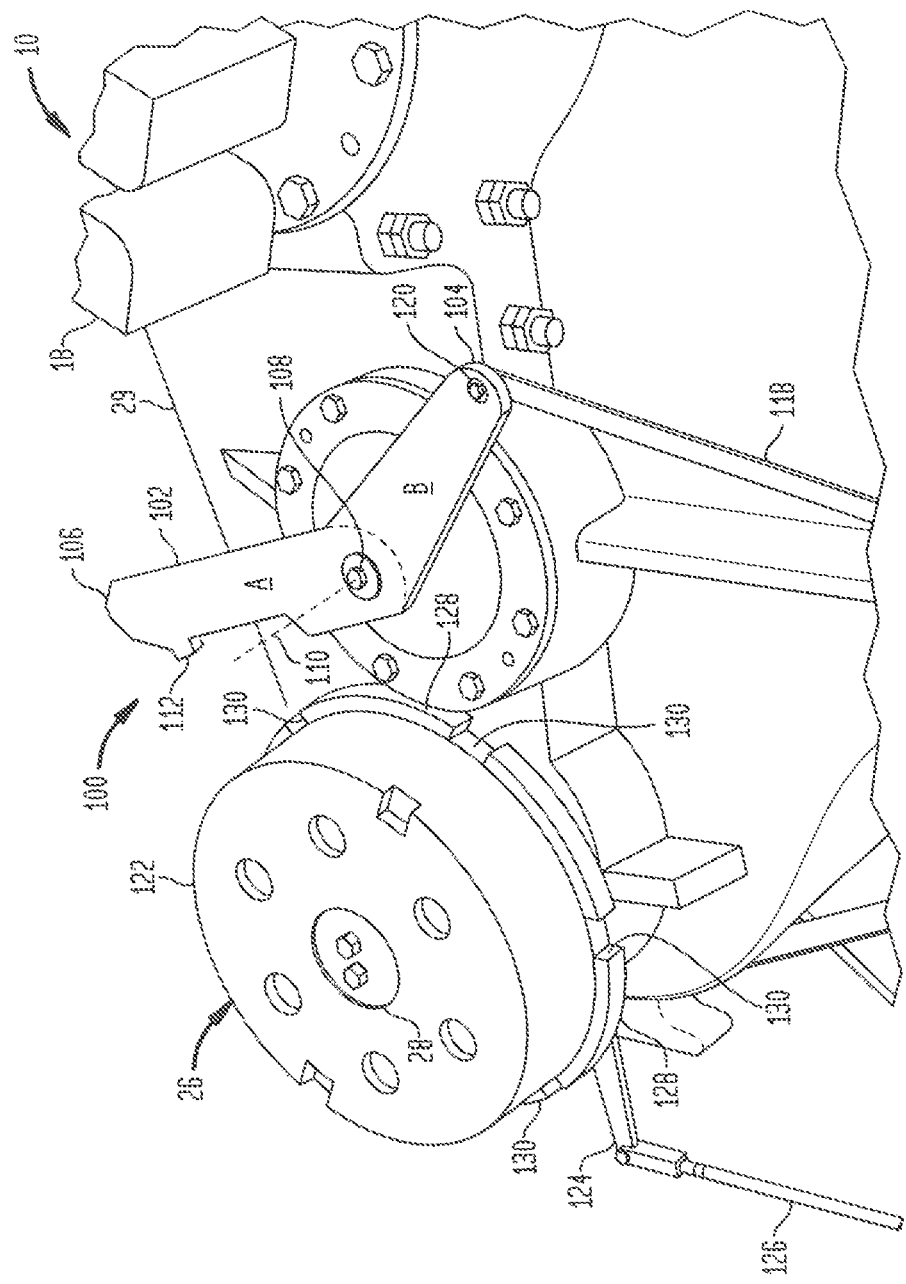
FIG. 2 is a perspective view of the brake and example latch arm with the example latch arm in unlatched position.
Figure 3:
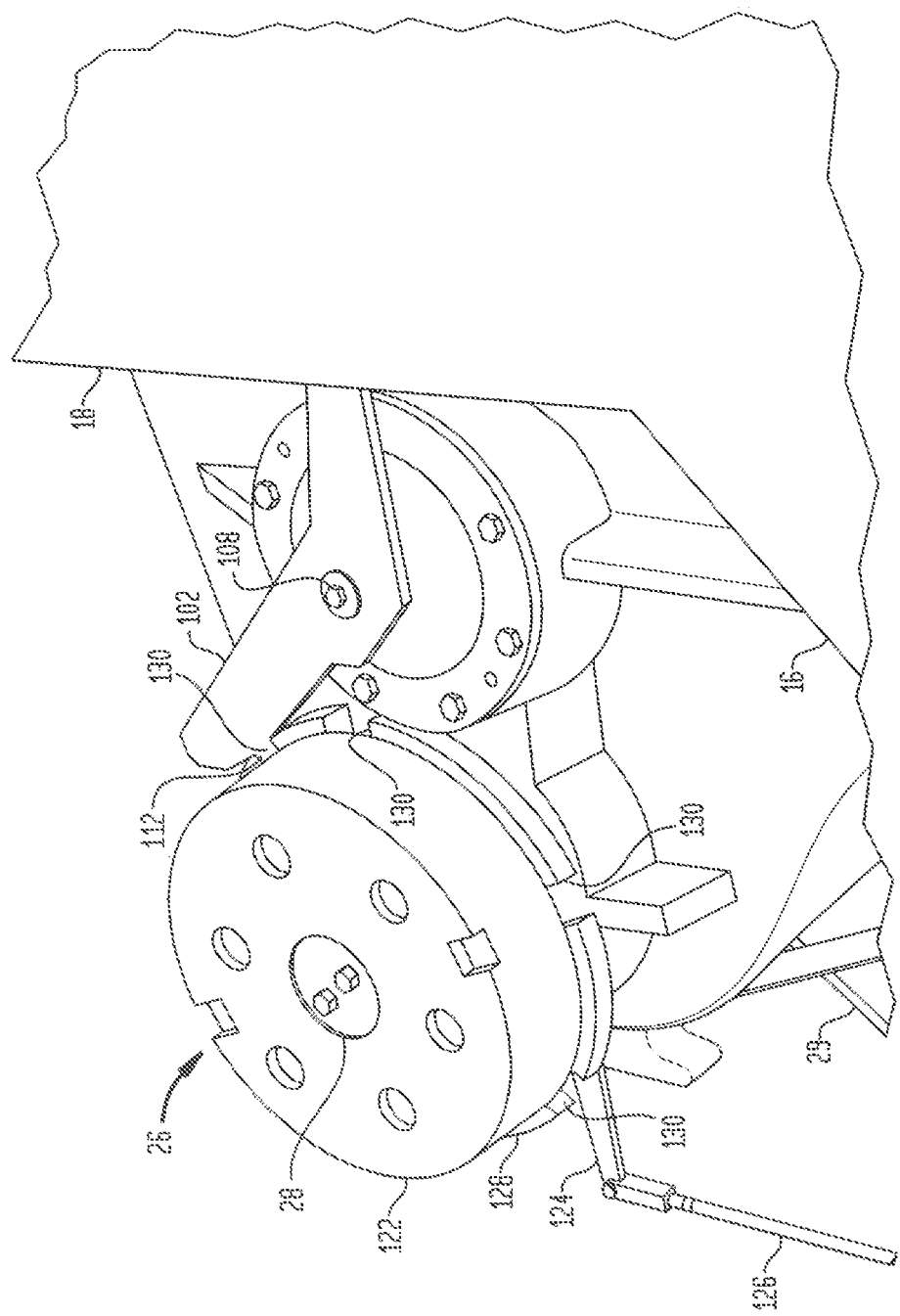
FIG. 3 is a perspective view of the brake and example latch arm similar to FIG. 2, but with the example latch arm in latched position.
Figure 4:
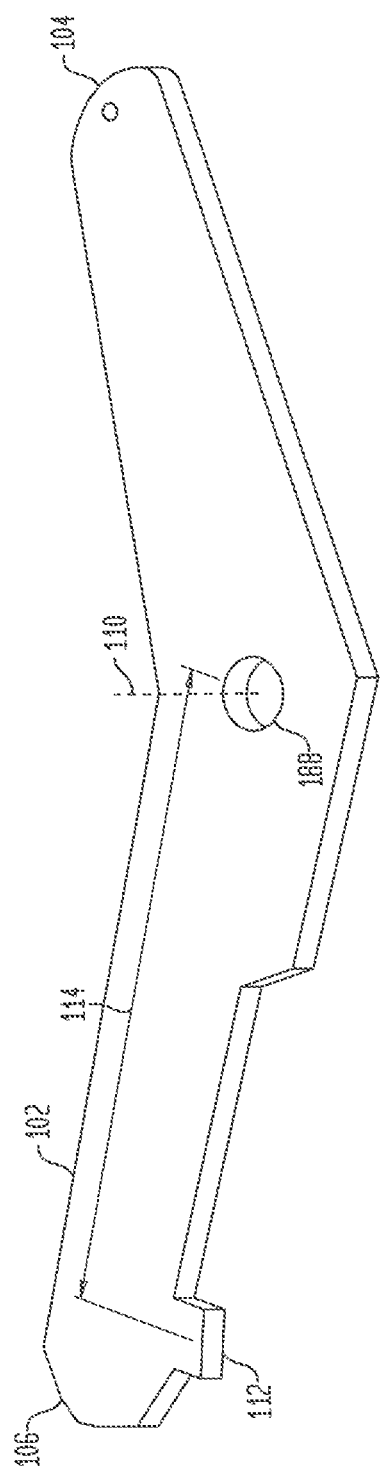
FIG. 4 is a perspective view of the latch arm.

An example latch apparatus 100 for locking a pumpjack 10 is shown in FIG. 2 in unlatched position and in FIG. 3 in latched position. The latch apparatus 100 includes a latch arm 102, which has a proximal end 104 and a distal end 106 and is pivotally mounted on a latch bolt 108, which defines a latch pivot axis 110 in the midportion of the latch arm 102 between the proximal end 104 and the distal end 106. The latch arm 102 also has a latch dog 112 protruding transversely from an edge of the latch arm 102 near the distal end 106 a center distance 114 (see FIG. 4) from the latch pivot axis 110. Part A of the latch arm 102 (demarked by the broken line 116 in FIG. 2) corresponds to the conventional latch 30 in FIG. 1, and the extension part B of the latch arm 102 is new. A latch control rod 118 is connected by a pin 120 to the proximal end 104 of the latch arm 102 for pivoting the latch arm 102 about the latch pivot axis 110 to move the latch dog 112 into and out of engagement with the brake 26, as will be explained in more detail below.

The example conventional brake 26 comprises a rotating component, e.g., a brake drum 122, with actuatable braking components, e.g., brake shoes, and a brake actuator mechanism to actuate the braking components, e.g., a brake shoe actuator mechanism (not visible in the Figures) inside the brake drum 122, as is well-known to persons skilled in the art. A brake actuator lever 124 is connected to the brake shoe actuator mechanism for actuating the brake shoes to (not visible in the Figures) engage the inside of the brake drum 122 in a frictional engagement for stopping rotation of the transmission shaft 28, which stops all movement of the crank unit 18, counterweights 24, pitman arms 16, walking beam 12, and other components of the pumpjack 10. A conventional brake control rod 126 is connected to the brake actuator lever 124 for operating the brake 26. When the transmission shaft 28 is stopped and no longer rotating, the latch arm 102 can be pivoted to move the latch dog 112 into engagement with a latch notch 130 in a rim 128 on the periphery of the brake drum 122, as best seen in FIG. 3, to prevent any rotation of the brake drum 122, which prevents any rotation of the transmission shaft 28. Again, the components and mechanisms described above in this paragraph are conventional and well-known and are not part of this invention other than as the example implementations of this invention interface with and act together with such conventional components and mechanisms, as described in more detail below.

Figure 5:
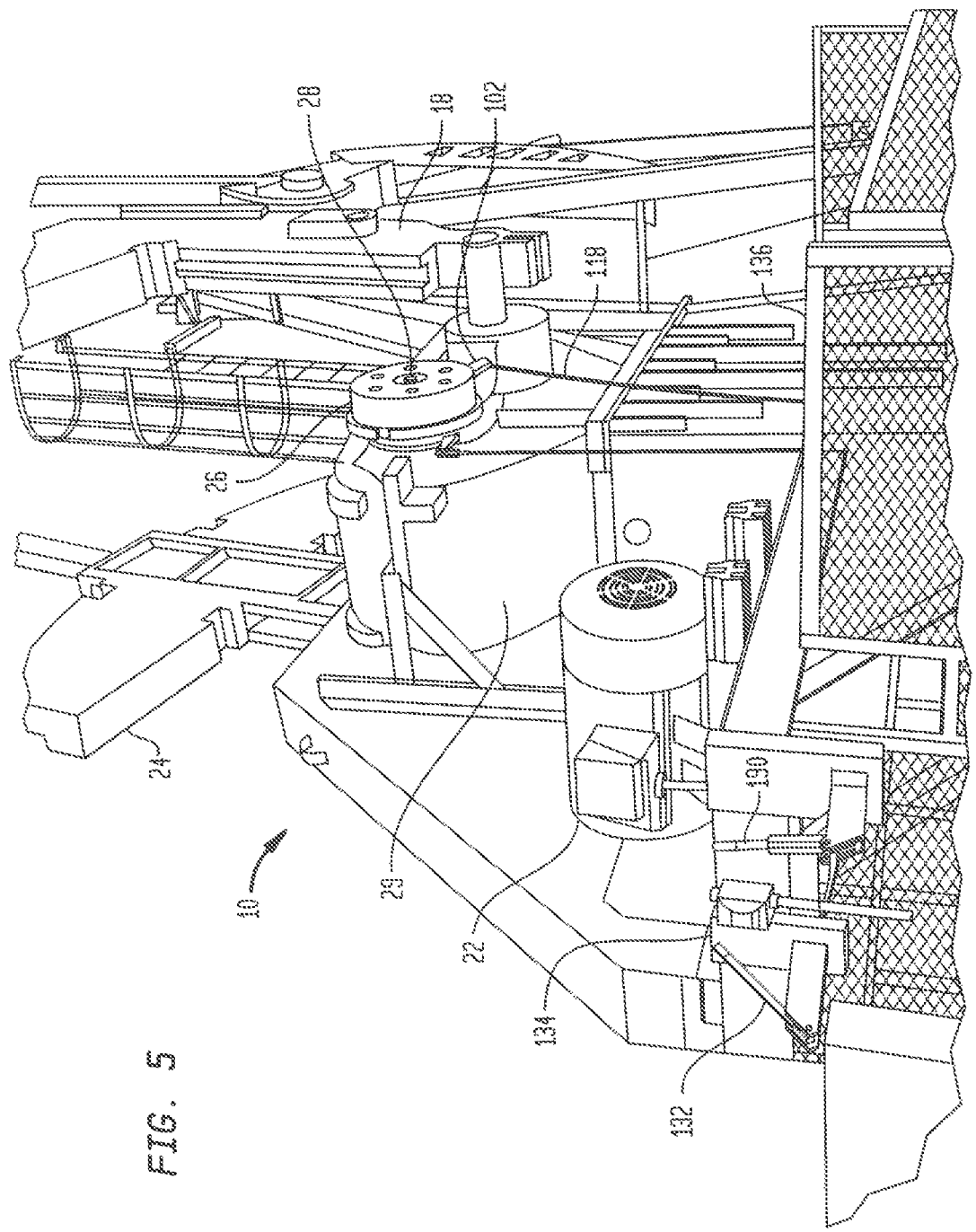
FIG. 5 is a perspective view of the example linkage mechanism for operating the latch apparatus on an example conventional pumpjack.

The conventional latch 30 in FIG. 1, corresponding to the part A of the latch arm 102 in FIG. 2, is very difficult and even somewhat dangerous to engage with the brake drum 122, especially on larger size pumpjacks 10, because, as best seen in FIG. 1, such conventional latches 30 are high enough above the ground that a person has to climb on the pumpjack 10 or get a ladder to reach the conventional latch 30. In contrast, the latch control rod 118 of the applicant's example latch apparatus 100 shown in FIG. 2 is connected through linkages, which are described in more detail below, to a manually operated latch handle lever 132 (see FIGS. 6 and 7) mounted at a convenient location on the support frame 134 of the pumpjack 10 where it can be reached and operated by a person of ordinary adult height (e.g., in a range of five feet to six and a half feet tall) standing adjacent to the pumpjack, for example, on the ground outside of the safety fence enclosure 136 as best seen in FIGS. 5 and 6.

Figure 6:
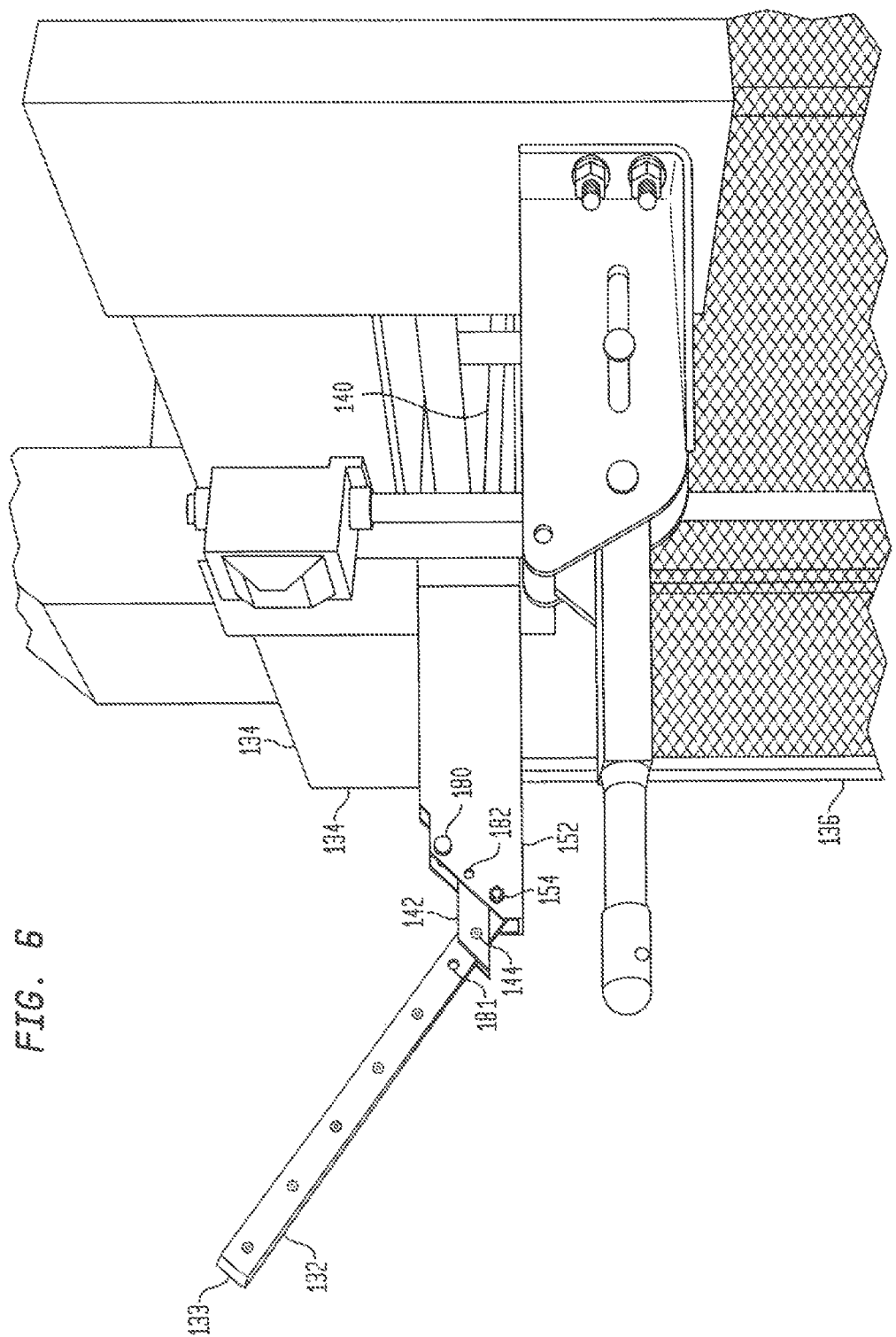
FIG. 6 is a close-up perspective view of the latch handle lever and linkage.

Referring now to FIGS. 6-10, the linkage that connects the latch handle lever 132 to the latch control rod 118 as mentioned above includes a latch link rod 140 connected at a proximal end by a proximal clevis 142 and proximal clevis pin 144, or any other convenient pivotal connecting apparatus, to the latch handle lever 132. The distal end of the latch link rod 140 is pivotally connected to a countershaft lever 146 by a distal clevis 148 and distal clevis pin 150. The latch handle lever 132 is pivotally mounted in a handle lever bracket 152 by a handle lever pivot pin 154. The distance between latch lever pivot pin 154 and the proximal clevis pin 144 as best seen in FIG. 6 is small compared to the length of the latch handle lever 132, so the latch handle lever 132 provides a significant mechanical advantage over the latch link rod 140 for pivoting the latch arm 102 on the latch bolt 108 (see FIG. 3) for moving the latch dog 112 into and out of engagement with the brake drum rim 128, i.e., moving the latch dog 112 into and out of the notch 130 in the brake drum rim 128.

Figure 7:
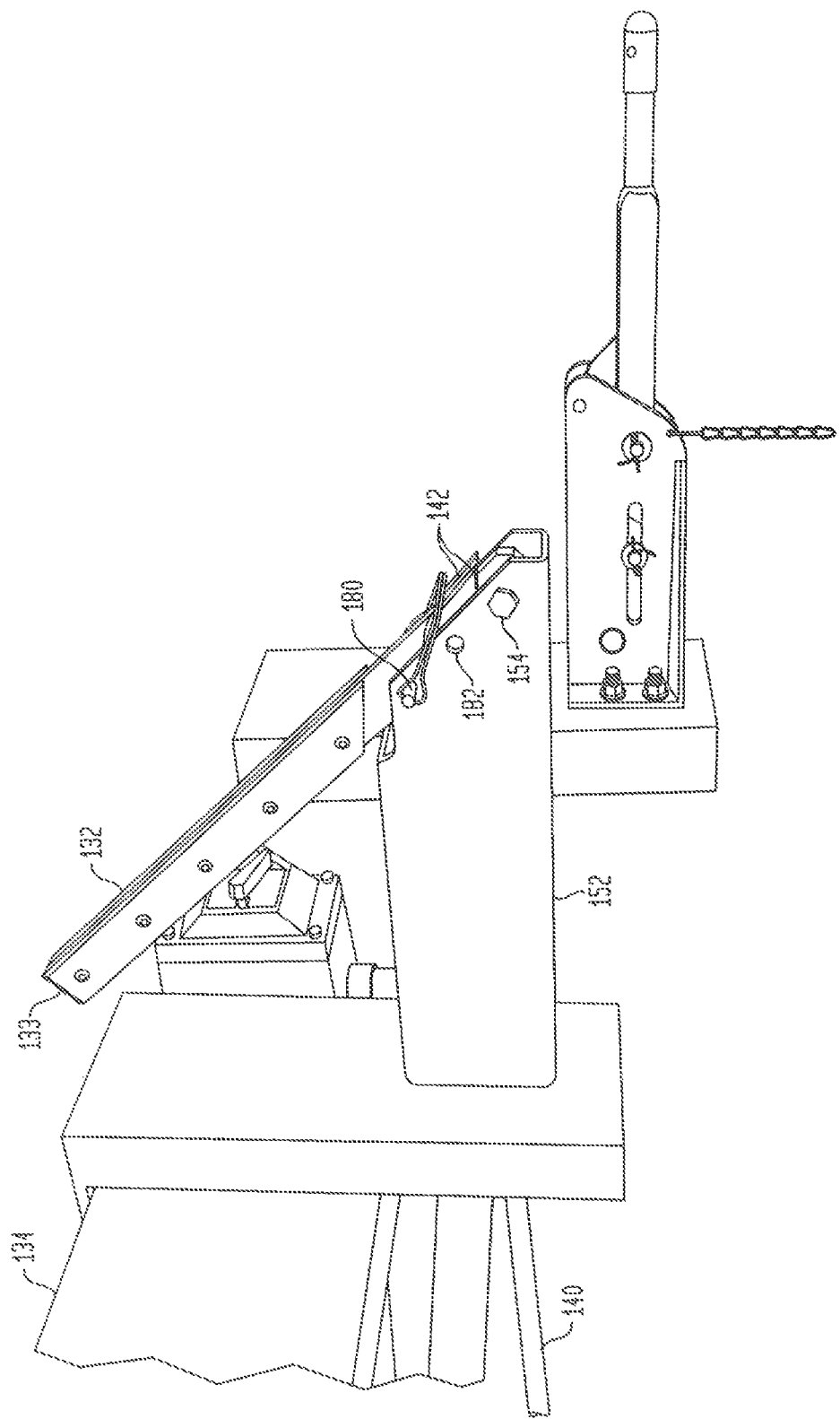
FIG. 7 is close-up perspective view of the latch handle lever from a different perspective than FIG. 6.
Figure 8:
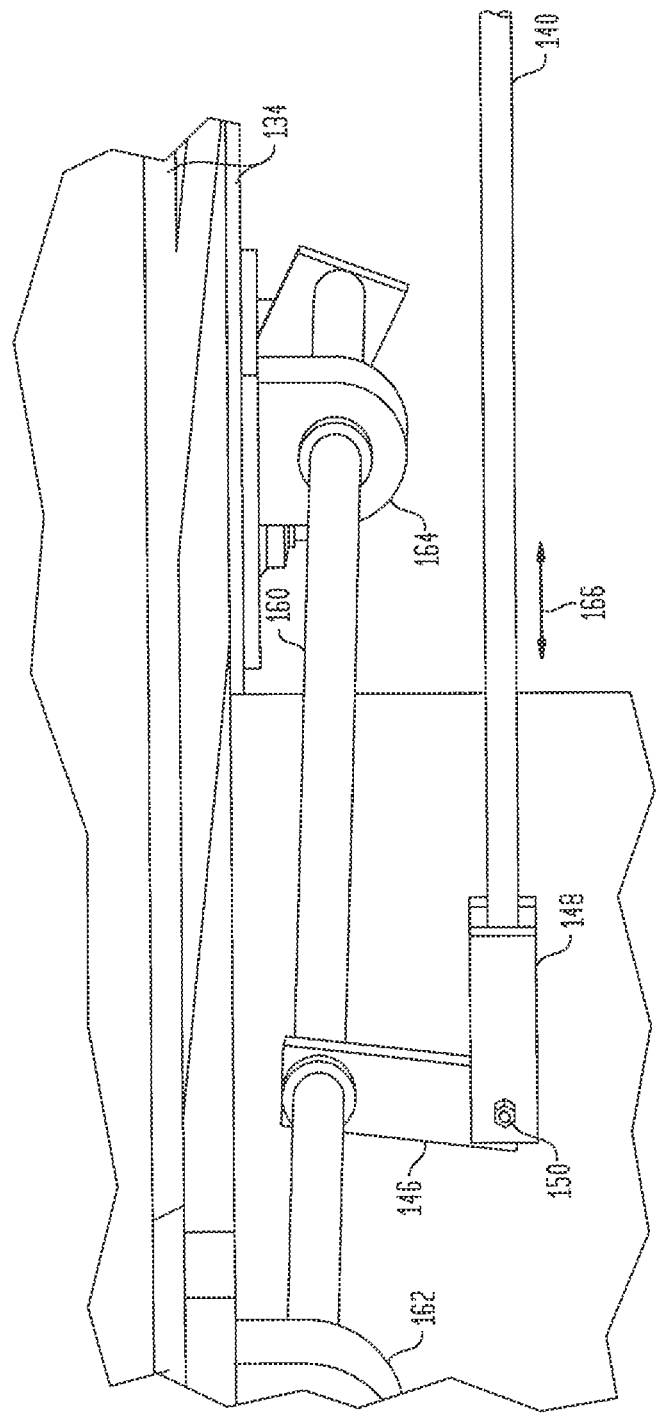
FIG. 8 is a close-up perspective view of the latch link rod and latch countershaft mounted under a frame piece of the pumpjack.
Figure 9:
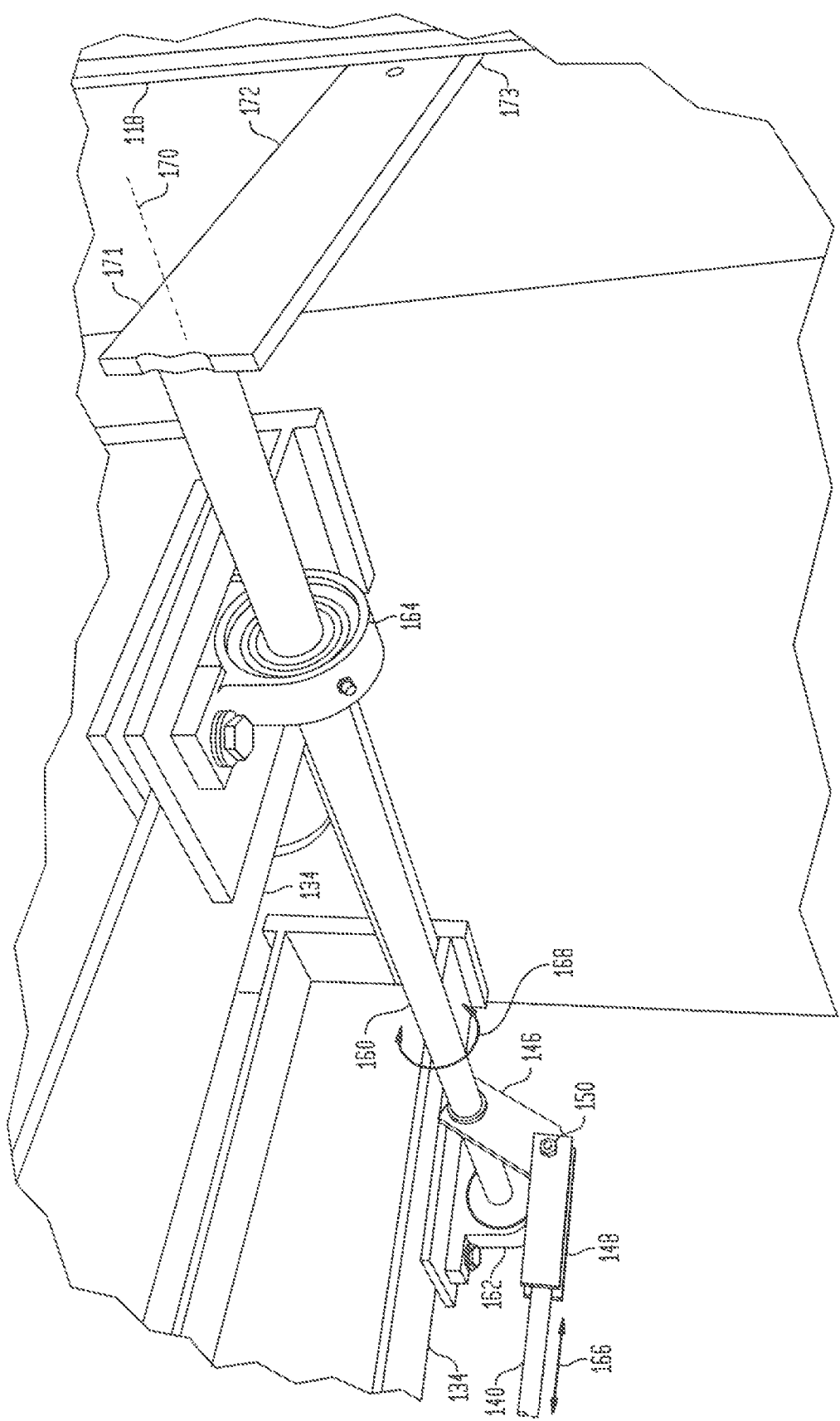
FIG. 9 is a close-up perspective view of the latch link rod and latch countershaft from a different perspective than FIG. 8.

The countershaft lever 146 is attached rigidly to a latch control countershaft 160 (best seen in FIGS. 7 and 8), which is mounted in a rotatable manner to support frame 134 of the pumpjack 10 by a pair of journal bearings 162, 164 as best seen in FIGS. 8 and 9. Consequently, linear movement back and forth of the latch link rod 140 by the latch handle lever 132, as indicated by the arrows 166 in FIGS. 8 and 9, causes the latch control countershaft 160 to rotate clockwise and counter-clockwise in the journal bearings 162, 164 as indicated by the arrow 168 in FIGS. 9 and 10.

Figure 10:
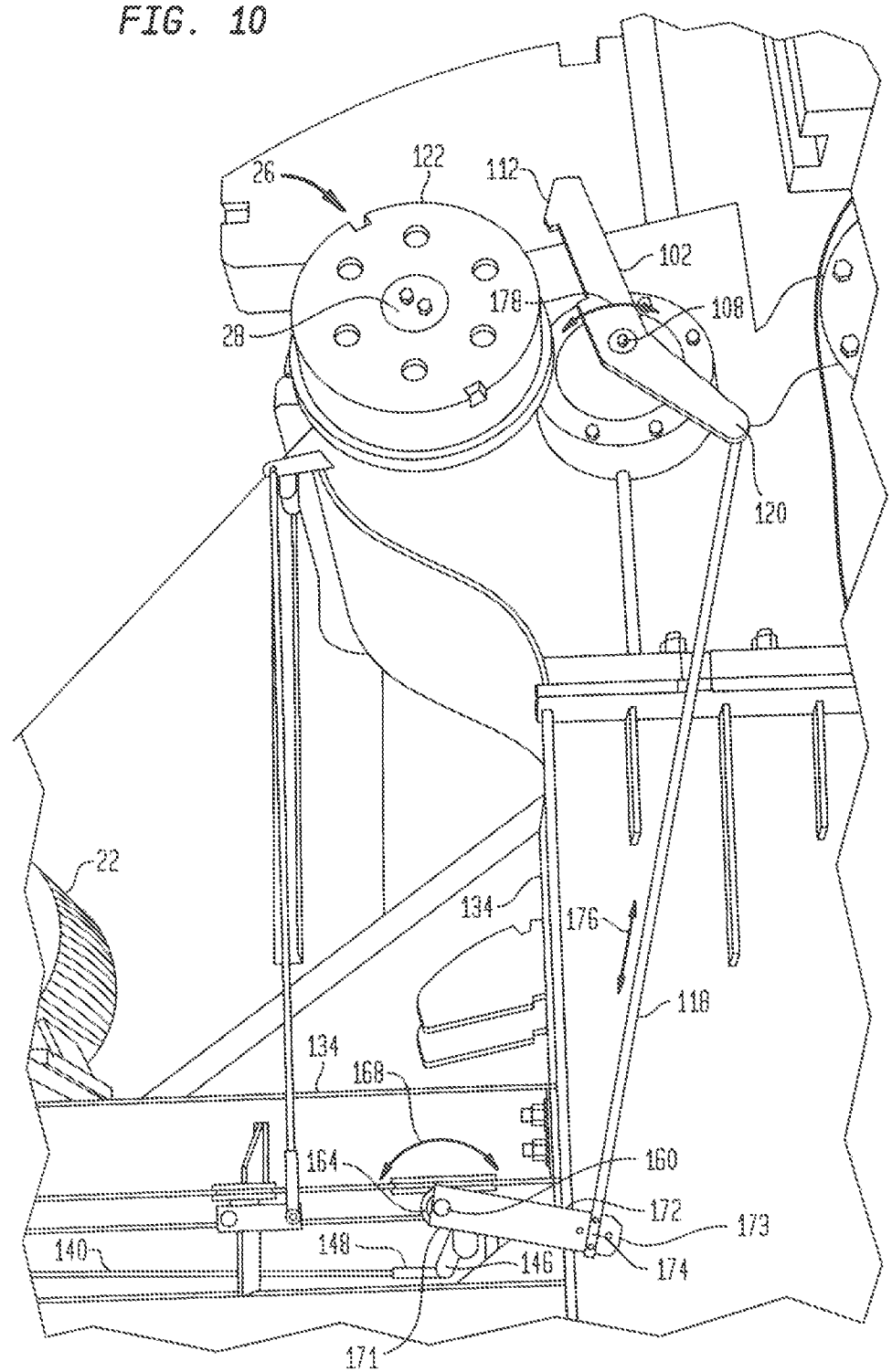
FIG. 10 is an elevation view of the linkage extending from the latch countershaft upwardly to the latch arm.

As best seen in FIGS. 9 and 10, a latch control lever 172 has a proximal end 171 attached in fixed relation to the latch control countershaft 160 that extends outwardly from the support frame 134, and the latch control lever 172 extends radially outward from the rotation axis 170 to a distal end 173 of the latch control lever 172 alongside the support frame 134, where the latch control lever 172 is attached in a pivotal manner to the latch control rod 118 by a pin 174 as best seen in FIG. 10. Therefore, the clockwise and counter-clockwise rotational movement 168 of the latch control countershaft 160 is converted by the latch control lever 172 to linear movement of the latch control rod 118 downwardly and upwardly as indicated by the arrow 176 in FIG. 10. Accordingly, the latch control countershaft provides an effective motion and force transition from the under-frame location of the latch link rod 140 to the side of the support frame 134, which accommodates positioning the latch handle lever 132 in a convenient location aligned with the middle of the pumpjack 10, as shown in FIG. 5-7, as well as transitioning the motion and force of the linkage from substantially horizontal back and forth movement 166 of the latch link rod 140 to movement 176 with a more vertical orientation component for the latch control rod 118 extending upwardly to the latch arm 102 as shown in FIG. 10. As explained above and also shown in FIG. 10, the latch control rod 118 extends from the latch control lever 172 upwardly alongside the support frame 134 of the pumpjack 10 to a pivotal connection of the latch control rod 118 to the proximal end 120 of the latch arm 102 by the pin 120. The downward and upward linear movement 176 of the latch control rod 118 causes the latch arm 102 to pivot clockwise and counterclockwise about the latch pivot axis 110 (FIG. 2) as indicated by the arrow 178 in FIG. 10. Therefore, the manual manipulation of the latch lever handle 132, applied to the latch arm 102 through the linkage mechanism described above, moves the latch dog 112 on the latch arm 102 into and out of engagement with the brake drum 122 by moving the latch dog 112 into and out of any one of the plurality of notches 130 (see FIGS. 2 and 3) that happens to be in alignment with the latch dog 112. For example, forward movement of the distal end 133 of the latch lever handle 132 to the position shown in FIG. 7 moves the latch dog 112 of the latch arm 102 into engagement with the brake drum 122, whereas backward movement of the distal end 133 of the latch lever handle 132 to the position shown in FIG. 6 moves the latch dog 112 of the latch arm 102 out of engagement with the brake drum 122. A removable lock pin 180 shown in FIG. 7 extends through holes in the handle lever bracket 152 and through a hole 181 (visible in FIG. 6 but not in FIG. 7) to lock the latch lever handle 132 in a fixed position in the handle lever bracket 152, which locks the latch arm 102 in the engaged position shown in FIG. 2, i.e., with the latch dog 112 positioned in one of the notiches 130. While not shown in the Figures, another lock pin could be provided anywhere in the linkage to lock the latch arm 102 and latch dog 112 in the disengaged position shown in FIG. 3, i.e., with the latch dog 112 not positioned in any of the notches 130. For example, to lock the latch arm 102 and latch dog 112 in the disengaged position shown in FIG. 3, the lock pin 180 shown in FIGS. 6 and 7 could be moved to extend through the holes 182 in the handle lever bracket 152 and through aligned holes (not visible in FIGS. 6 and 7) in the proximal clevis 142 when the latch lever handle 132 is in the disengaged position shown in FIG. 6.

Figure 11:
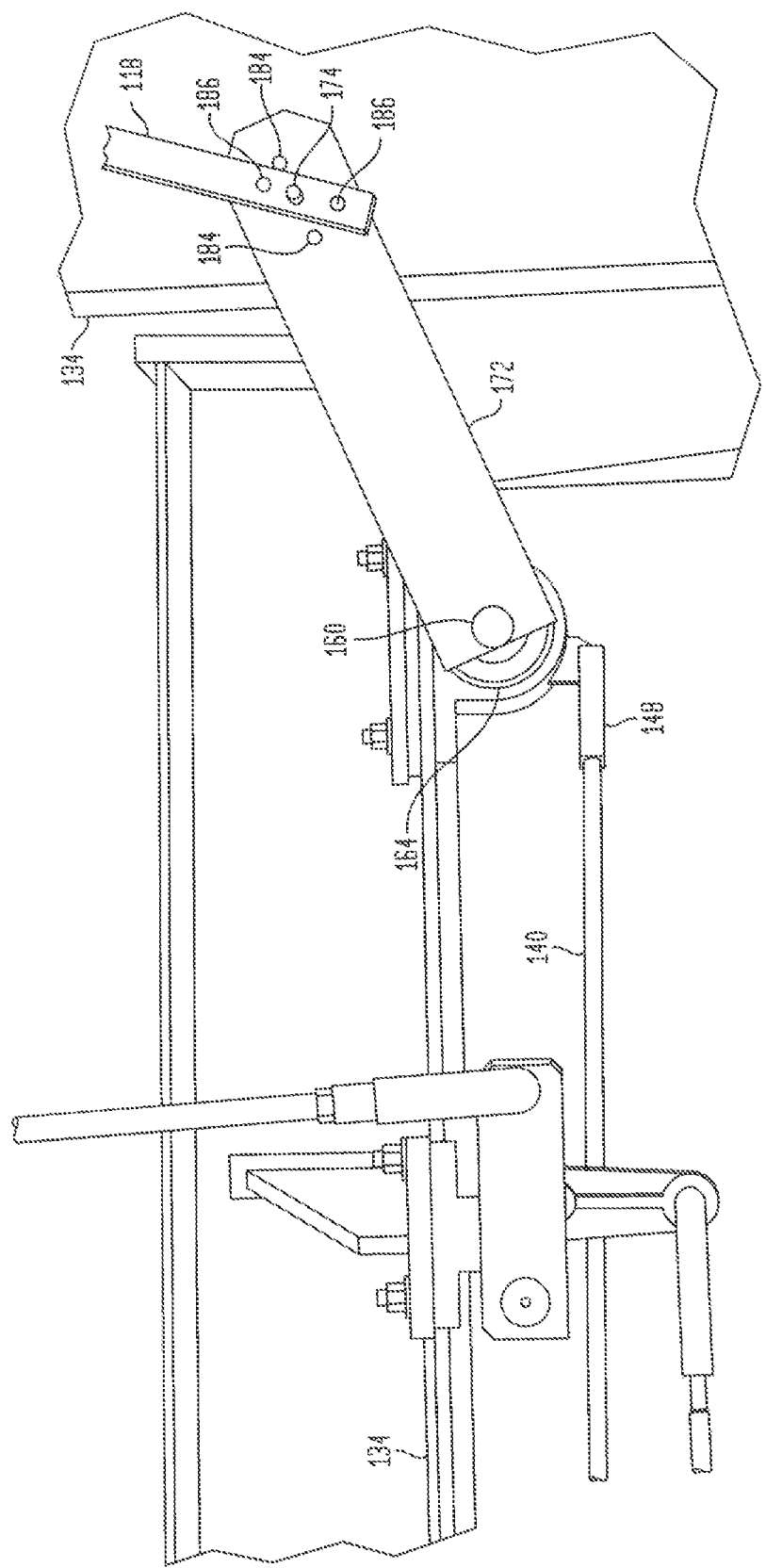
FIG. 11 is close-up elevation view of the latch control arm linkage transition from the latch control countershaft to the latch control rod, including adjustment holes in the latch control arm and the latch control rod.

The various lengths of the several lever arms in the lever latch handle 132, linkage mechanism, and latch arm 102 (e.g., the distance from the distal end 133 of the lever latch handle 132 to the axis of the handle lever pivot pin 154, the distance of the axis of the handle lever pivot pin 154 to the axis of the proximal clevis pin 144, the distance of the axis of the distal clevis pin 150 to the rotation axis 170 of the latch control countershaft 160, the distance of the rotation axis 170 of the latch control countershaft 160 to the axis of the pin 174 that connects the latch control lever 172 to the latch control rod 118, the distance of the axis of the pin 120 that connects the latch control rod 118 to the latch arm 102, the distance of the axis of the pin 120 to the axis 110 of the latch bolt 108, and the distance 114 of the axis 110 to the latch dog 112 can all be varied as desired to provide a desired resultant mechanical advantage and relative movement distances between the distal end 133 of the latch lever handle 132 and the latch dog 112 for ease of movement and convenience. For example, as shown in FIG. 11, several additional holes 184 are provided in the latch control lever 172 and several additional holes 186 are provided in the latch control rod 118 for options in varying the resultant mechanical advantage and relative movement distances between the distal end 133 of the latch lever handle 132 and the latch dog 112. In the example latch and linkage mechanism shown in FIGS. 2-11 and described above, a mechanical advantage, defined as ratio of movement of the distal end 133 of the latch lever handle 132 to the resultant movement of the latch dog 112, in a range of 1.5:1 to 8:1 has been determined to provide effective and convenient operation of the latch arm 102 with the latch lever handle 132. A mechanical advantage in a range of 1.75:1 to 4:1 is preferable, because it balances a person's normal arm movement and strength with effective motion distance of the latch arm 102 for reliable engagement and disengagement of the latch dog 112 with the notch 130.

Also, as shown in FIG. 5, the linkage described above accommodates positioning the latch handle lever 132 at a location where a person can easily reach and operate or manipulate both the brake lever 190, which operates the brake 26, and the latch handle lever 132 while standing in the same position. This feature is advantageous, because getting the dog 112 of the latch arm 102 to engage one of the notches 130 in the brake drum 122 can often be facilitated by loosening the brake 26 just enough to allow the pumpjack shaft 28 to slowly rotate enough to align the notch 130 with the dog 112, and that operation is facilitated by having the latch handle lever 132 located where a person standing in one place can easily manipulate both the latch handle lever and the brake lever 132, sometimes simultaneously, e.g., operating one with the right hand and the other with the left hand. As also shown in FIGS. 2, 3 and 10, the example latch arm 102 is formed with an obtuse angle between the respective ends 104, 106 and the center hole 188 as the vertex of the angle to keep the proximal portion B of the latch arm 102 and the latch control rod 118 from interfering with the brake drum 122, because the latch bolt 108 is an existing bolt on the pumpjack 10. Other arrangements can be made for mounting the latch arm 102 without interference with the brake drum 122 if desired.

Figure 12:
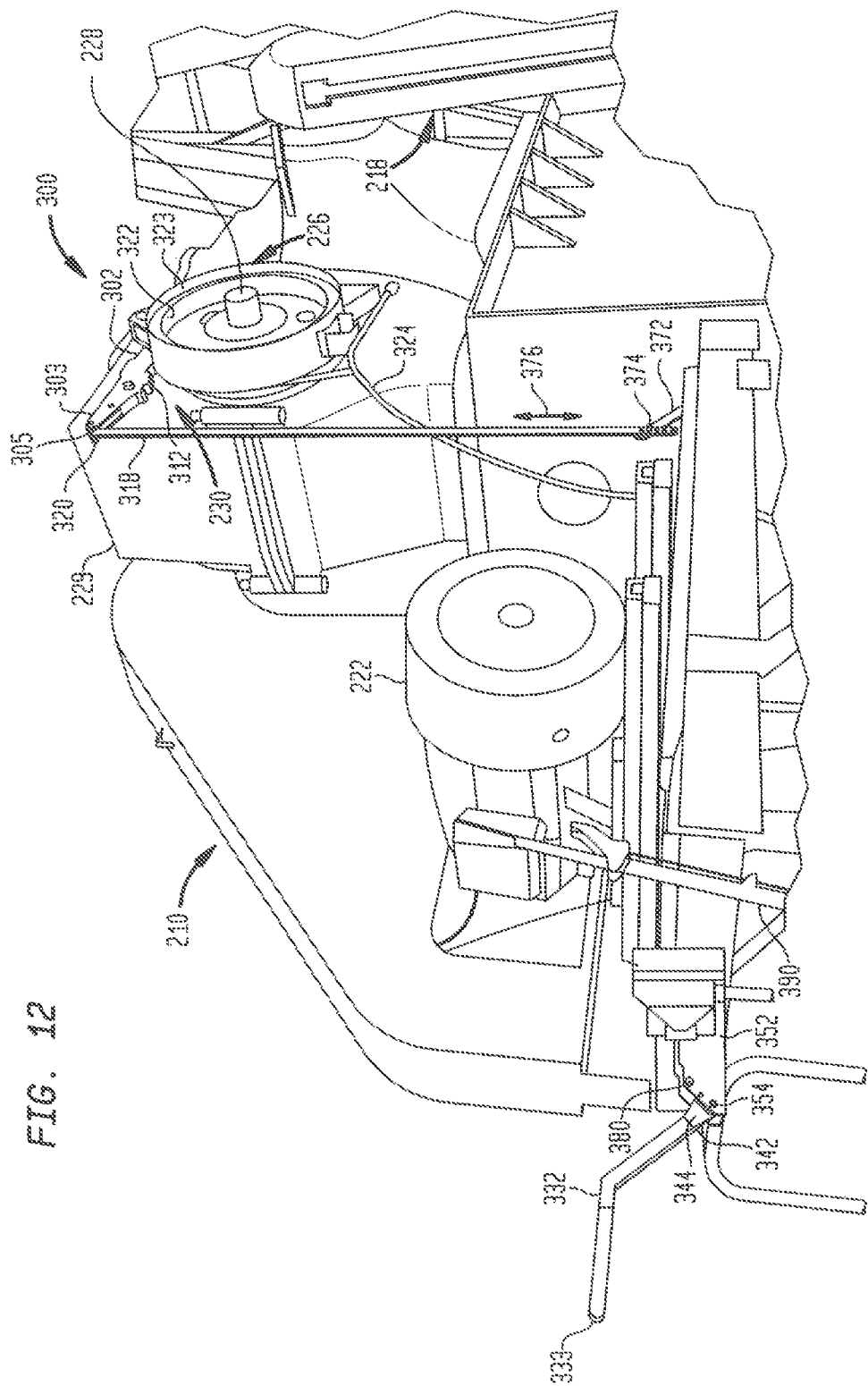
FIG. 12 shows an alternate embodiment comprising another example latch apparatus mounted on a different example pumpjack.
Figure 13:
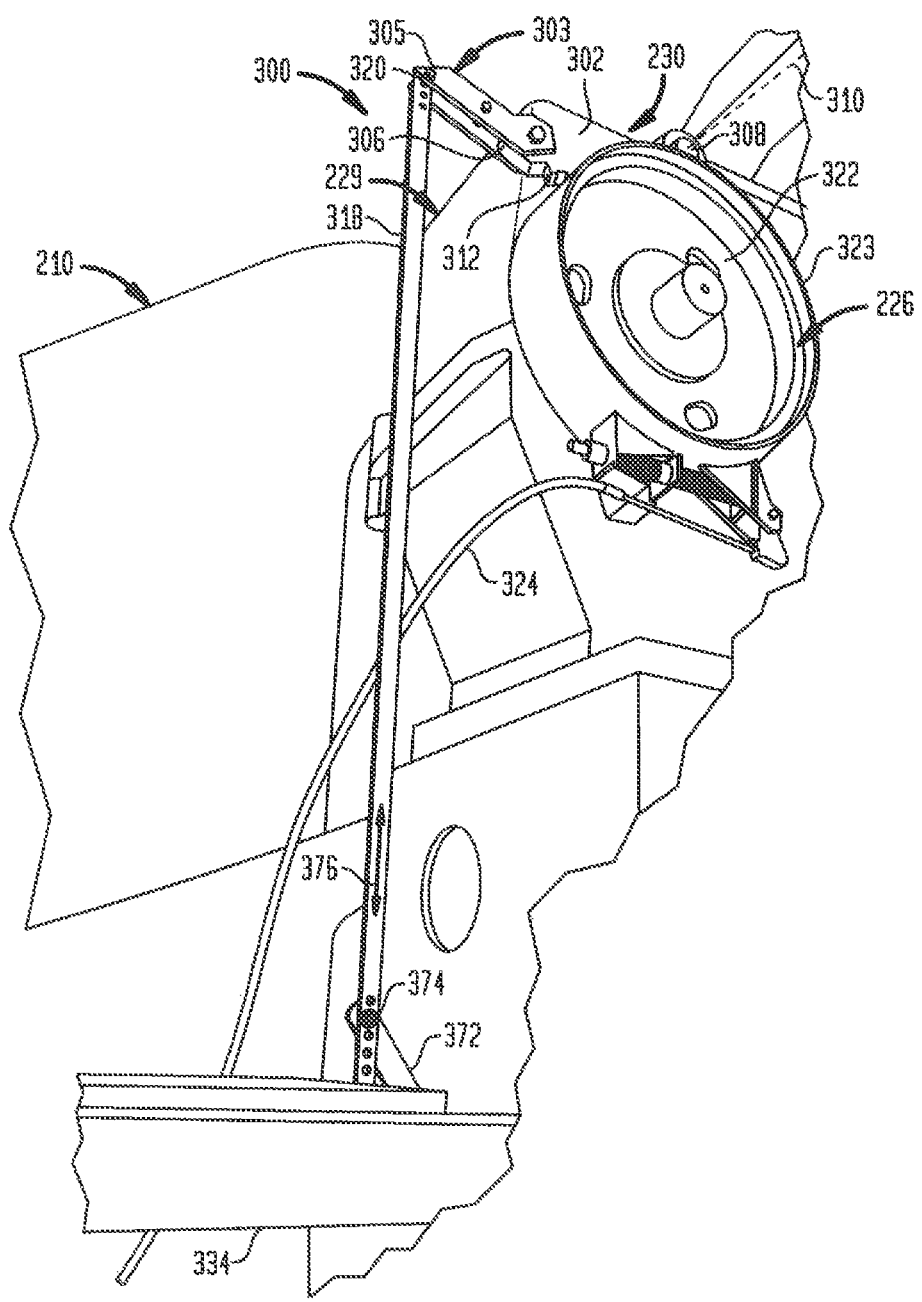
FIG. 13 is a closer view of the part of the linkage of the example alternative embodiment latch apparatus in FIG. 12 that extends vertically along the side of the pumpjack and connects to the latch arm of the pumpjack.
Figure 14:
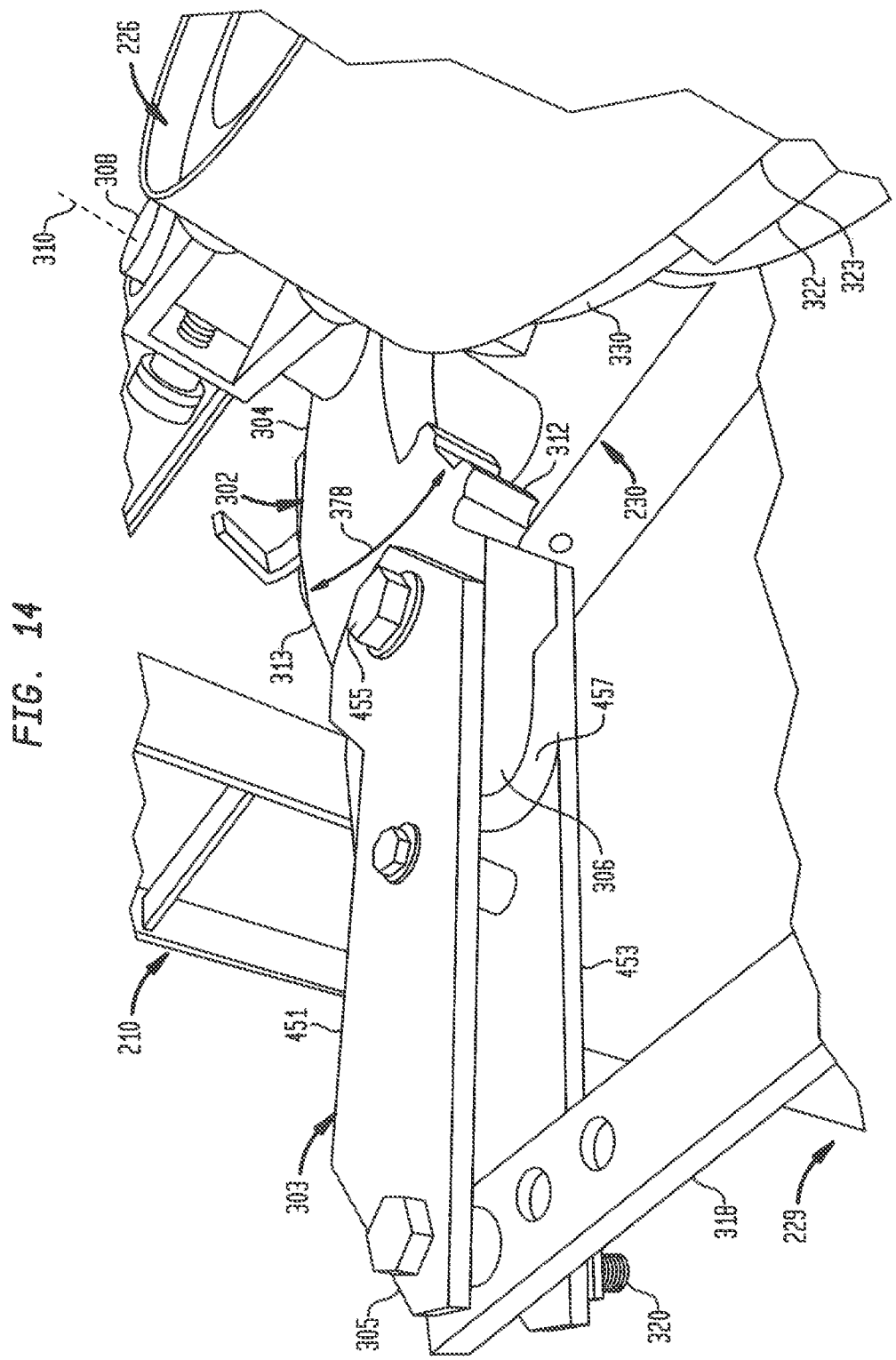
FIG. 14 is a close-up view of the alternate embodiment latch arm interface with the brake drum of the pumpjack for locking the transmission shaft of the pumpjack.
Figure 15:
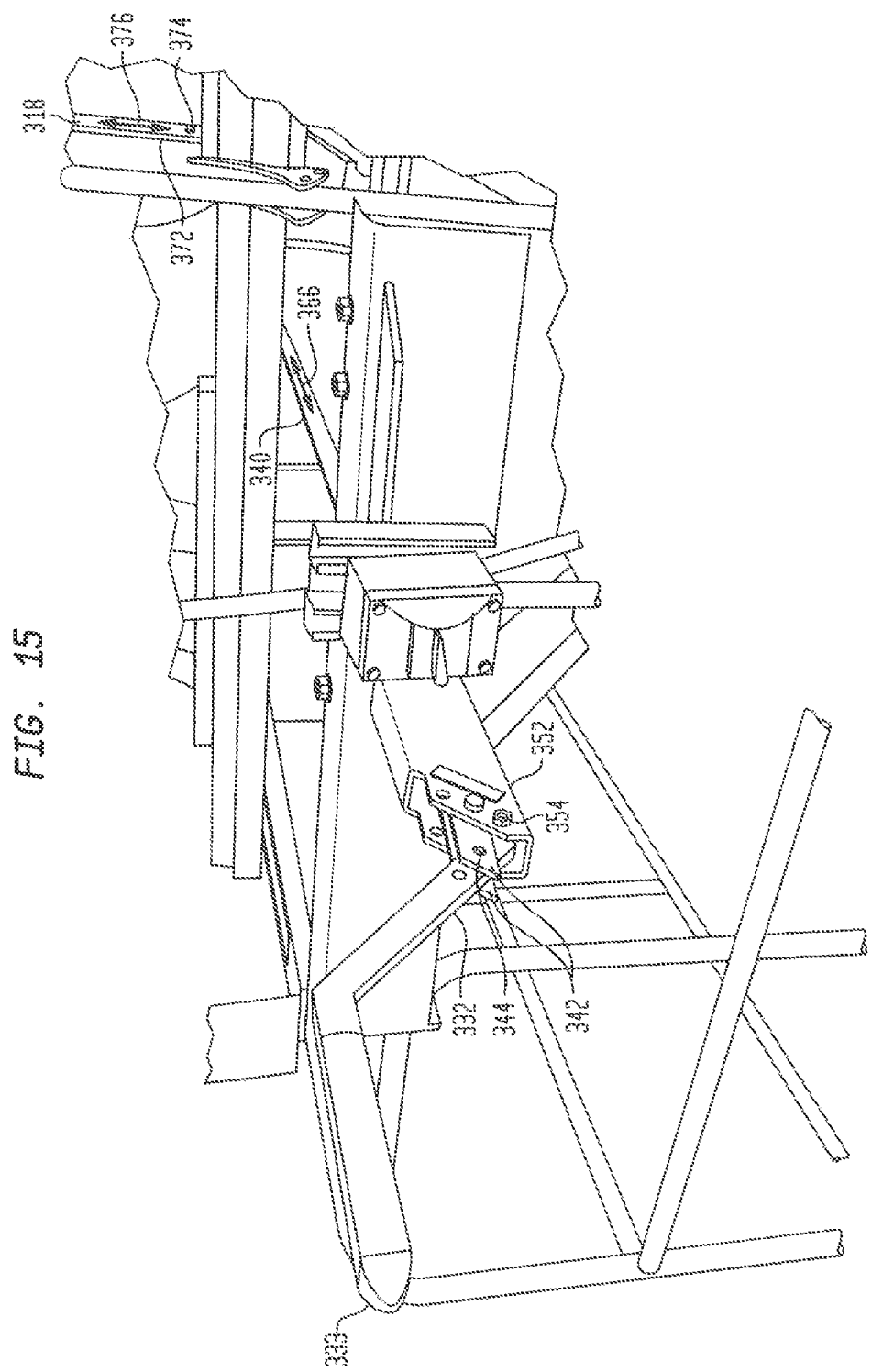
FIG. 15 is a view of the handle portion of the example alternative embodiment latch apparatus.

An alternate embodiment illustrated by another example latch apparatus 300 is shown in FIGS. 12-18 mounted on a different example pumpjack 210. The example pumpjack 210 shown in the FIGS. 12-18 is based on a well-known pumpjack manufactured by Lufkin Industries, Lufkin, Tex. As best seen in FIGS. 12-14, a motor 222 on the pumpjack 210 drives a crank unit 218, whidh converts rotary motion of the motor 222 to reciprocal motion of a walking beam (not seen in FIGS. 12-18, but similar to the walking beam 12 in FIG. 1). The walking beam operates the well pump as explained above. The rotary motion of the motor 222 is transmitted to the crank unit 218 through a transmission 229 by rotation of a transmission shaft 228. A brake assembly 226 comprising a brake drum 322 and brake shoe 323 are provided on the transmission shaft 228 to stop rotation of the transmission shaft 228 and thereby also stop rotation of the crank unit 218 when the motor 222 is turned off. A latch mechanism 230 is provided for engagement with the brake drum 322 to prevent rotation of the crank unit 218, even if the brake 226 is released. A brake control cable 324 connects a brake lever 390 to the brake shoe 323 for operation of the brake 226. Actuation of the brake shoe 323 by manipulation of the brake lever 390 tightens the brake shoe 323 on the brake drum 322, which binds the peripheral surface of the brake drum 322 to stop rotational motion of the transmission shaft 228, thereby stopping movement of the crank unit 218 and the walking beam. The latch arm 302 has a proximal end 304 pivotally mounted on a latch bolt 308, a distal end 306, and a latch dog 312 protruding transversely from a midportion 313 of the latch arm 302 between the proximal end 304 and the distal end 306 toward the brake drum 322. There are one or more notches 330 in the peripheral surface of the brake drum 322. The latch bolt 308 defines a latch pivot axis 310, and pivotal movement of the latch arm 302 about the latch pivot axis 310 moves the latch dog 312 toward and away from the brake drum 322, thus into and out of engagement with the notch 330. The motor 222, crank unit 218, transmission 229, transmission shaft 228, and brake 226, and latch mechanism 230 are standard, well-known components of the example Lufkin pumpjack 210. While the latch arm 302 is somewhat different than the latch arm 102 of the example Weatherford pumpjack 10 described above, the problems with access to, and manual setting of, the latch arm 302 to engage the latch dog 312 with the notch 330 in the brake drum 322 is much the same as the problems described above regarding the latch mechanism 30 on the Weatherford example pumpjack 10.

Those problems are alleviated by the alternate embodiment latch apparatus 300 shown in FIGS. 12-20. In the example latch apparatus 300, a latch arm extension 303 is attached in immovable relation to the distal end 306 of the latch arm 302, and a latch control rod 318 is connected by a pin 320 to the distal end 305 of the latch arm extension 303 for pivoting the latch arm 302 about the latch pivot axis 310 to move the latch dog 312 into and out of engagement with the brake drum 322, as will be explained in more detail below.

Figure 16:
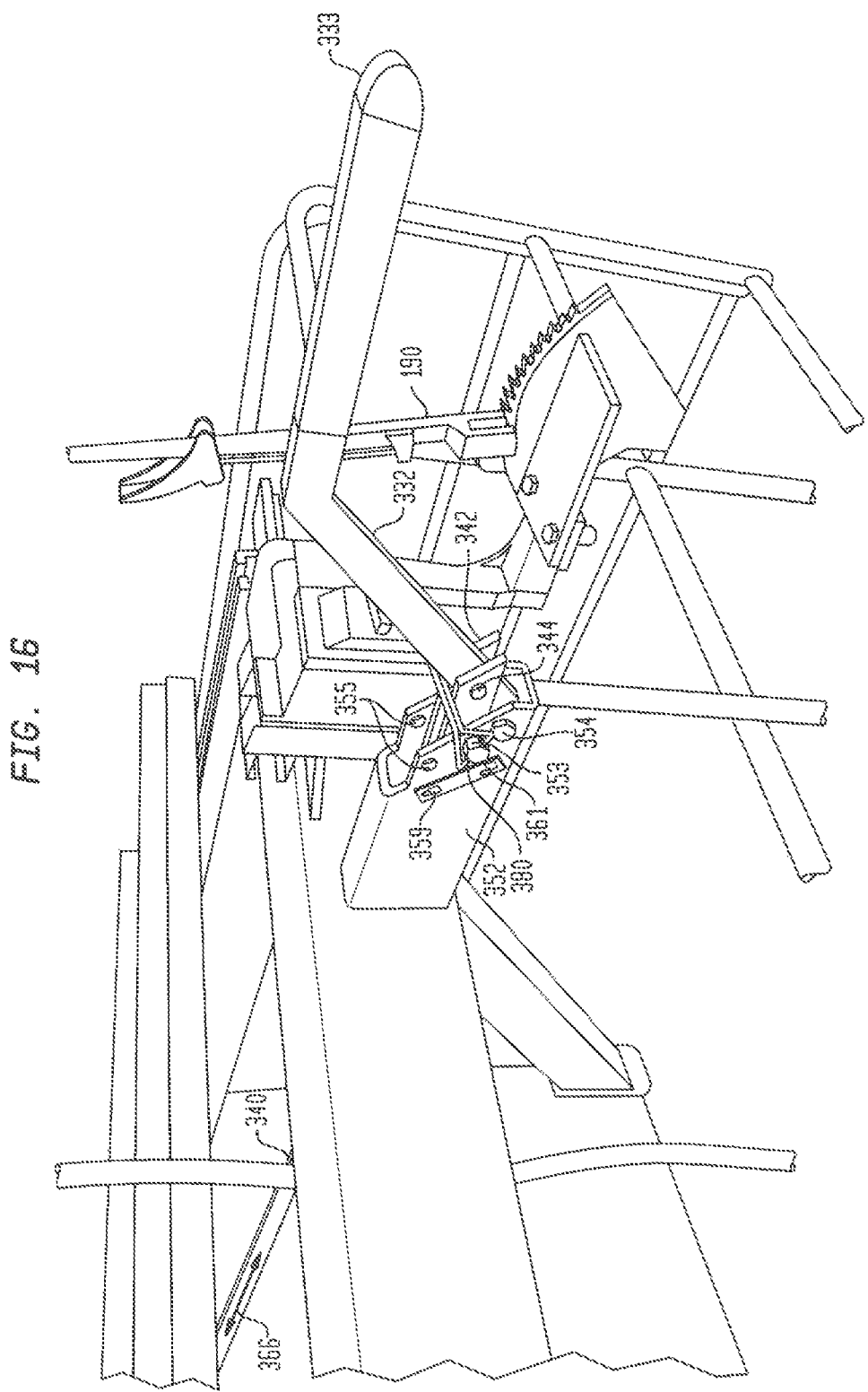
FIG. 16 is a view from another perspective of example alternative embodiment latch apparatus.

Referring now primarily to FIGS. 12 and 15-18, the example latch apparatus 300 includes a linkage (described in more detail below) that connects a latch handle lever 332 to the latch control rod 318. The linkage includes a latch link rod 340 connected at a proximal end by a proximal clevis 342 (see FIGS. 15 and 16) and proximal clevis pin 344, or any other convenient pivotal connecting apparatus, to the latch handle lever 332. The distal end of the latch link rod 340 is pivotally connected to a countershaft lever 346 by a pin 350. The latch handle lever 332 is pivotally mounted in a handle lever bracket 352 by a handle lever pivot pin 354 (see FIGS. 15 and 16). The distance between latch lever pivot pin 354 and the proximal clevis pin 344 as best seen in FIG. 16 is small compared to the length of the latch handle lever 332, so the latch handle lever 332 provides a significant mechanical advantage over the latch link rod 340 for pivoting the latch arm 302 on the latch bolt 308 for moving the latch dog 312 (see FIG. 14) into and out of engagement with the brake drum 322, i.e., by moving the latch dog 312 into and out of one of the notches 330.

Figure 17:
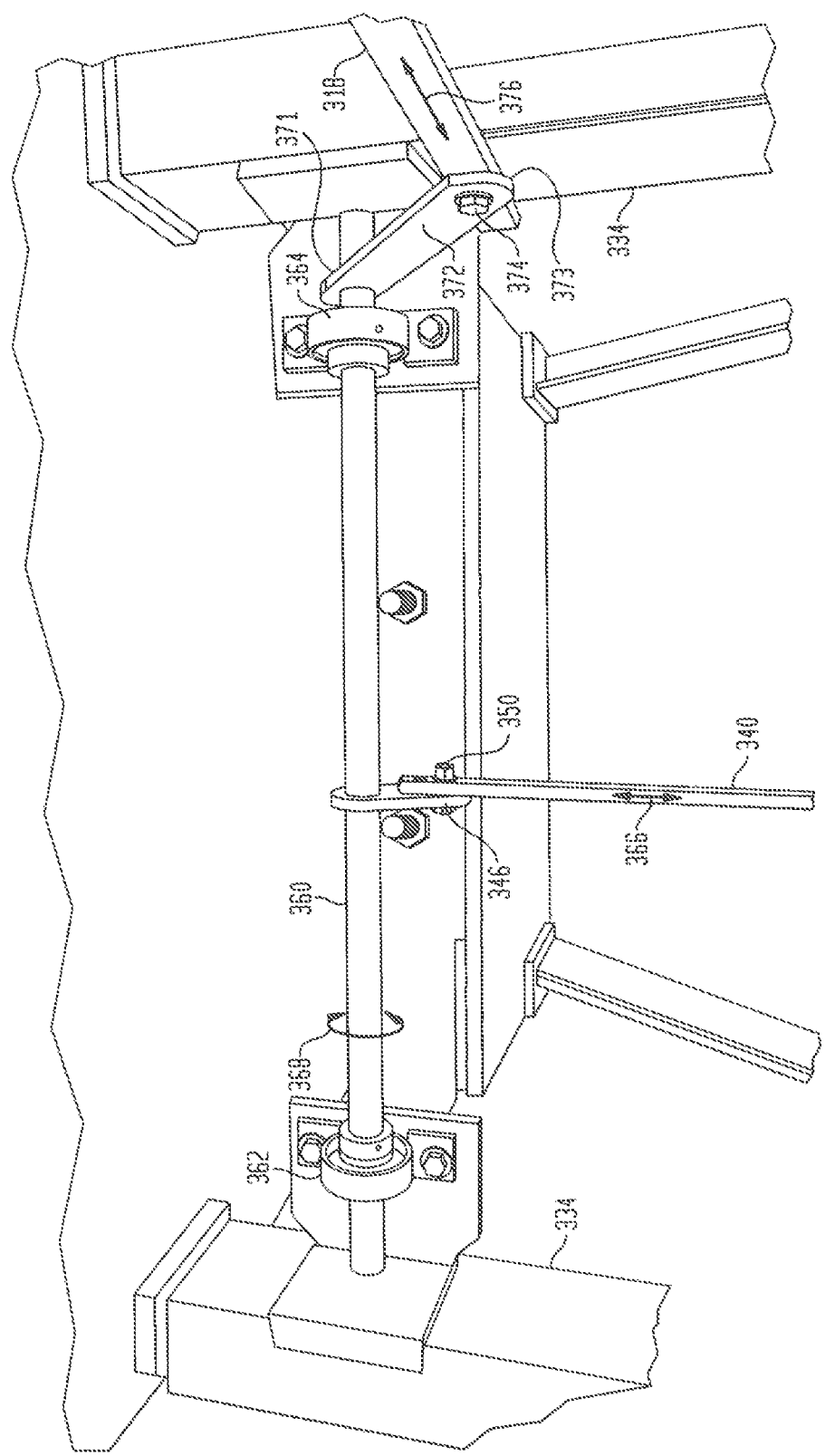
FIG. 17 is a view of the countershaft portion of the linkage of the example alternative embodiment latch apparatus.

The countershaft lever 346 is attached rigidly to a latch control countershaft 360, which is mounted in a rotatable manner to support frame 334 of the pumpjack 210 by a pair of journal bearings 362, 364 as best seen in FIG. 17. Consequently, linear movement back and forth of the latch link rod 340 by the latch handle lever 332, as indicated by the arrows 366 in FIGS. 15-18, causes the latch control countershaft 360 to rotate clockwise and counter-clockwise in the journal bearings 362, 364 as indicated by the arrow 368 in FIG. 17.

As best seen in FIG. 17, a latch control lever 372 has a proximal end 371 attached in fixed relation to an end of the latch control countershaft 360, and the latch control lever 372 extends radially outward from the latch control countershaft 360 to a distal end 373 of the latch control lever 372 alongside the support frame 334, where the latch control lever 372 is attached in a pivotal manner to the latch control rod 318 by a pin 374. Therefore, the clockwise and counterclockwise rotational movement 368 of the latch control countershaft 360 is converted by the latch control lever 372 to linear movement of the latch control rod 318 downwardly and upwardly as indicated by the arrow 376 in FIGS. 12, 13, and 17. Accordingly, the latch control countershaft 360 provides an effective transition of motion and force from the under-frame location of the latch link rod 340 to a side of the support frame 334 below the distal end 305 of the latch arm extension 303, as best seen in FIGS. 12 and 13, which accommodates positioning the latch handle lever 332 in a convenient location aligned with the middle of the pumpjack 210 as well as transitioning the motion and force of the linkage from substantially horizontal back and forth movement 366 of the latch link rod 340 to movement 376 with a more vertical orientation component for the latch control rod 318 extending upwardly to the latch arm 302. As explained above, the latch control rod 318 extends from the latch control lever 372 upwardly alongside the transmission 229 of the pumpjack 210 to a pivotal connection of the latch control rod 318 to the distal end 305 of the latch arm extension 303 by the pin 320. The downward and upward linear movement 376 of the latch control rod 118 causes the latch arm 302 to pivot clockwise and counterclockwise about the latch pivot axis 310 (FIGS. 13 and 14) as indicated by the arrow 378 in FIG. 14. Therefore, the manual manipulation of the latch lever handle 332, applied to the latch arm 302 through the linkage mechanism described above, moves the latch dog 312 on the latch arm 302 into and out of engagement with the brake drum 322 as described above and shown in FIG. 14. For example, forward movement of the distal end 333 of the latch lever handle 332 to the position shown in FIGS. 12 and 20 moves the latch dog 312 of the latch arm 302 into engagement with the brake drum 122, i.e., into the notch 330, whereas backward movement of the distal end 333 of the latch lever handle 332 to the position shown in FIG. 19 moves the latch dog 112 of the latch arm 102 out of engagement with the brake drum 122, i.e., out of the notch 330.

A modified example latch lever handle 432 shown in FIGS. 19 and 20 has a socket 434 at its distal end, and a removable handle extension 436 fits into and extends from the socket 434. A removable lock pin 438 is sized to extend for extension through aligned holes in the socket 434 and in the handle extension 436 to secure the handle extension 436 in the socket 434 when the latch apparatus 300 is in use to set the latch dog 312 of the latch arm 302 into the notch 330 to secure the brake drum 322 and transmission shaft 228 against rotation as described above. On the other hand, after the latch handle lever 332 is moved with the handle extension 436 to the non-use position shown in FIG. 19 to rotate the latch arm 302 and thereby the latch dog 312 out of engagement with the brake drum 322 (see FIGS. 12-14), the lock pin 438 (FIG. 19) can be removed from the socket 434, and the handle extension 436 can be removed from the socket 434 and stored out of the way.

Also, another removable lock pin 380 shown in FIGS. 12, 15, 16, and 20 extends through holes 353 in the handle lever bracket 352 and through holes 381 in the proximal clevis 342 to lock the latch link rod 340 and the latch lever handle 332 in a fixed position in the handle lever bracket 352, which locks the latch arm 302 in the engaged position as described above. On the other hand, when the latch handle lever 332 is moved to the unlatched position shown in FIG. 19, which disengages the latch dog 312 of latch arm 302 from the brake drum 322, the lock pin 380 can be inserted through then aligned holes 355 in the handle lever bracket 352 and hole 357 in the latch handle lever 332 to retain the latch handle lever 332 and latch arm 302 in the unlatched (disengaged) position from the brake drum 322. Lock and unlocked labels can be provided adjacent to the respective holes 355, 353 as shown at 359, 361 in FIG. 16 to indicate the respective holes 355, 353 in the handle lever bracket 352 are associated with the locked (latch dog 312 engaged) and unlocked (latch dog 312 disengaged) positions of the latch handle lever 332. While not shown in the Figures, another lock pin could be provided anywhere in the linkage to lock the latch arm 302 and latch dog 312 in the engaged position or in the disengaged position.

Similar to the explanation above regarding the example latch apparatus 100, the various lengths of the several lever arms in the lever latch handle 332, linkage mechanism, and latch arm 302 (e.g., the distance from the distal end 333 of the lever latch handle 332 to the axis of the handle lever pivot pin 354, the distance the axis of the handle lever pivot pin 354 to the axis of the proximal clevis pin 344, the distance of the axis of the pin 350 to the rotation axis of the latch control countershaft 360, the distance of the rotation axis of the latch control countershaft 360 to the axis of the pin 374 that connects the latch control lever 372 to the latch control rod 318, the distance of the axis of the pin 320 that connects the latch control rod 318 to the latch arm 302, the distance of the axis of the pin 320 to the axis 310 of the latch bolt 308, and the distance of the axis 310 to the latch dog 312 can all be varied as desired to provide a desired resultant mechanical advantage and relative movement distances between the distal end 333 of the latch lever handle 332 (or of the handle extension 436 in FIG. 19) and the latch dog 312 for ease of movement and convenience. As explained above, a mechanical advantage, defined as ratio of movement of the distal end 333 of the latch lever handle 132 (or of the handle extension 436) to the resultant movement of the latch dog 312, in a range of 1.5:1 to 8:1 has been determined to provide effective and convenient operation of the latch arm 302 with the latch lever handle 332, but a mechanical advantage in a range of 1.75:1 to 4:1 is preferable, because it balances a person's normal arm movement and strength with effective motion distance of the latch arm 302 for reliable engagement and disengagement of the latch dog 312 with the notch 330.

Also, as explained above, the linkage described above accommodates positioning the latch handle lever 332 at a location where a person can easily reach and operate or manipulate both the brake lever 390, which operates the brake 226, and the latch handle lever 332 while standing in the same position for the advantages explained above.

The example latch arm extension 303 for the conventional existing latch arm 302 of the example pumpjack 210, best seen in FIG. 14, is provided with the example latch apparatus 300 to provide sufficient clearance between the latch control rod 118 and the brake 226. While such a latch arm extension 303 can be made in a variety of ways, including, for example, simply making a longer latch arm 302 to extend farther from the latch dog 312 to a distal end than the existing known latch arm 302 or welding or otherwise fastening an extension to the distal end 306 of the conventional latch arm 302, the example latch arm extension 303 is a structure that enables a relatively simple attachment to the conventional existing latch arm 302. The example latch arm extension 303 comprises two parallel plates 451, 453 fastened to the distal end 306 of the latch arm 302 by a bolt 455. A collar 457 on the internal surface of at least one of the plates, e.g., plate 451 in FIG. 14, is shaped to match the distal end 306 of the latch arm 302, so the distal end 306 of the latch arm 302 is nested in the collar 457 when the plates 451 and 453 are fastened onto the latch arm 302 with the bolt 455. Therefore, the combination of the collar 457 with the bolt 455 prevents rotational movement of the latch arm extension 303 in relation to the latch arm 302 when the bolt 455 is tightened.

The details, components, and structures described above are examples of implementations of the invention, but other structures and components could also be used to implement the invention. Other features of the invention can be discerned from the description above and the accompanying drawings in FIGS. 1-11, which form a part of this description. For example, but not for limitation, instead of providing the latch arm 102 in one unitary piece, the portion B shown in FIG. 2 can be made as an attachment to an existing portion A. Also, instead of the latch link rod 166 and countershaft lever 146 for transitioning the rotational motion of the latch handle lever 332 to rotational movement of the countershaft 160 as described above, the transition of motion and force could be provided by a first pulley or sprocket (not shown) connected to the latch handle lever 332, a second pulley or sprocket (not shown) mounted on the countershaft 160, and a belt or chain (not shown) extending over and between such first and second pulleys or sprockets. The respective diameters of the first and second pulleys or sprockets can be the same, or they can be different from each other to provide some mechanical advantage between the latch handle lever 332 and the countershaft 160. For example, a first pulley or sprocket mounted on the latch handle lever 332 that is smaller in diameter than the diameter of the second pulley or sprocket mounted on the countershaft 160 will provide the latch handle lever with an additional mechanical advantage over the countershaft and vice versa. Also, the transition of motion and force from the countershaft 160 to the latch arm 102 could be provided by a third pulley or sprocket (not shown) mounted on the countershaft 160 and a fourth pulley or sprocket (not shown) mounted on the latch arm 102 with a belt or chain extending over and between such third and fourth pulleys or sprockets instead of by the latch control lever 172 and the latch control rod 118 described above, and additional mechanical advantage of the latch handle lever 332 over the latch arm 102 can be provided by a smaller diameter third pulley or sprocket on the countershaft 160 than the diameter of the fourth pulley or sprocket on the latch arm.

The foregoing description is considered as illustrative of the principles of the invention. Furthermore, since numerous modifications and changes will readily occur to those skilled in art, it is not desired to limit the invention to the exact construction and process shown and described above. Accordingly, resort can be made to all suitable modifications and equivalents that fall within the scope of the invention. The words "comprise," "comprises," "comprising," "include," "including," and "includes" when used in this specification are intended to specify the presence of stated features, integers, components, or steps, but they do not preclude the presence or addition of one or more other features, integers, components, steps, or groups thereof.

The embodiments of the invention in which an exclusive property or privilege is claimed are defined as follows:

1. A brake lock apparatus (100, 300) for a pumpjack (10, 210), the brake lock apparatus comprising:
   a latch arm (102, 302) that is pivotally mounted on the pumpjack (10, 210) adjacent to a brake (26, 226), the brake (26, 226) comprising a rotating component (122, 322) on a rotatable shaft (28, 228) of the pumpjack (10, 210) and a brake actuator mechanism, wherein the latch arm (102, 302):
      (i) is too high to be reachable by a person of ordinary adult height standing adjacent to the pumpjack (10, 210) without a ladder; and
      (ii) has a latch dog (112, 312) protruding laterally from the latch arm (102, 302) such that pivotal movement of the latch arm (102, 302) in one direction engages the latch dog (112, 312) with a notch (130, 330) in a peripheral surface of the rotating component to prevent rotation of the rotating component and shaft (28, 228) and such that movement of the latch arm (102, 302) in the opposite direction disengages the latch dog (112, 312) from the notch (30, 330) in the rotating component;
   a latch handle lever (132, 332) pivotally mounted at a location on the pumpjack (10, 210) that is within reach by a person of ordinary adult height standing adjacent to the pumpjack without a ladder for operation of the latch arm (102, 302), wherein the latch handle lever (132, 332) is pivotal in a plane that is perpendicular to the shaft (28, 228) of the pumpjack (10, 210), and the location of the latch handle lever (132, 332) on the pumpjack (10, 210) is also close enough to a brake lever (190, 390) on the pumpjack (10, 210) that operates the brake actuator mechanism of the brake (26, 226) to enable such person standing in such position adjacent to the pumpjack (10, 210) to reach and operate both the brake lever (190, 390) and the latch handle lever (132, 332) simultaneously;

a horizontal countershaft (160, 360) rotatably mounted on the pumpjack (10, 210) in a manner that allows the countershaft (160, 360) to be rotated about a horizontal longitudinal axis (170) that is parallel to the shaft (28, 228) of the pumpjack (10, 210) and perpendicular to the plane in which the latch handle lever (132, 332) is pivotal;

a control linkage between the countershaft (160, 360) and the latch arm (102, 302) for transitioning the rotational motion of the countershaft (160, 360) to the pivotal movement of the latch arm (102, 302), wherein said control linkage includes:
  (i) a latch control lever (172, 372) connected to the countershaft (160, 260); and
  (ii) a latch control rod (118, 318) that is connected pivotally to the latch arm (102, 302) and pivotally to the latch control lever (172, 372); and a latch handle linkage between the latch handle lever (132, 332) and the countershaft (160, 260) for transitioning the pivotal movement of the latch handle lever (132, 332) to rotational movement of the countershaft (160, 360) about the longitudinal axis (170) of the countershaft (160, 360).

2. The brake lock apparatus of claim 1, wherein the latch handle linkage comprises a latch link rod (140, 340) pivotally connected to the latch handle lever (132, 332) and pivotally connected to a countershaft lever (146, 346) extending radially from the countershaft, (160, 360).

3. The brake lock apparatus of claim 2, wherein the latch arm (102) comprises a first part (A) extending from a center hole (108) in the latch arm (102) to a distal end (106) and a second part (B) extending from the center hole (108) to a proximal end (104) with an obtuse angle between the respective distal and proximal ends (106, 104) and the center hole (108) as the vertex of the angle, and wherein the latch arm (102) is pivotally mounted on the pumpjack at the center hole (108) in the latch arm (102), the latch dog (112) protrudes laterally from the latch arm (102) adjacent to the distal end (106) of the latch arm (102), and the latch control rod (118) is connected pivotally to the latch arm (102) adjacent to the proximal end (104) of the latch arm (102).

4. The brake lock apparatus of claim 1, wherein the latch handle linkage comprises a first pulley or sprocket connected to the latch handle lever, a second pulley or sprocket mounted on the countershaft, and a belt or chain extending over and between the first pulley or sprocket and the second pulley or sprocket.

5. The brake lock apparatus of claim 1, wherein the latch handle linkage and the control linkage have dimensions that provide a mechanical advantage of the latch handle lever over the latch arm in a range of 1.5:1 to 8:1.

6. The brake lock apparatus of claim 1, wherein the latch handle linkage and the control linkage have dimensions that provide a mechanical advantage of the latch handle lever over the latch arm in a range of 1.75:1 to 4:1.

7. The brake lock apparatus of claim 1, wherein the latch arm (302) includes a latch arm extension (303) comprising two parallel plates (451, 453) fastened to the latch arm (302), wherein the parallel plates (451, 453) extend from an end of the latch arm (302), and wherein the latch control rod (318) is connected pivotally to the latch arm extension (302).

8. The brake lock apparatus of claim 7, including a collar (457) on one of the parallel plates, and wherein the end of the latch arm is nested in the collar (457).

\* \* \* \* \*